United States Patent [19]
Jasinski

[11] Patent Number: 5,530,918
[45] Date of Patent: Jun. 25, 1996

[54] METHOD AND APPARATUS FOR MESSAGE SCHEDULING IN A MULTI-SITE DATA RADIO COMMUNICATION SYSTEM

[75] Inventor: Leon Jasinski, Ft. Lauderdale, Fla.

[73] Assignee: Motorola, Inc., Schaumburg, Ill.

[21] Appl. No.: 349,352

[22] Filed: Dec. 5, 1994

[51] Int. Cl.⁶ ............................. H04B 7/26; H04Q 7/30; H04Q 7/18; H04Q 7/22
[52] U.S. Cl. ..................... 455/56.1; 455/38.1; 455/51.2; 340/825.44
[58] Field of Search ................................ 455/38.1, 51.2, 455/56.1, 67.1, 63, 67.3; 340/825.44

[56] References Cited

U.S. PATENT DOCUMENTS

| | | | |
|---|---|---|---|
| 4,613,990 | 9/1986 | Halpern | 455/52 |
| 4,670,906 | 6/1987 | Thro | 455/56 |
| 4,825,193 | 4/1989 | Siwiak et al. | 340/825.47 |
| 5,038,403 | 8/1991 | Leitch | 455/51 |
| 5,162,790 | 11/1992 | Jasinski | 340/825.44 |
| 5,193,101 | 3/1993 | McDonald et al. | 455/33.1 |
| 5,369,786 | 11/1994 | Hulsebosch | 455/56.1 |
| 5,430,889 | 7/1995 | Hulbert et al. | 455/56.1 |
| 5,448,758 | 9/1995 | Grube et al. | 455/51.2 |
| 5,465,397 | 11/1995 | Pickert | 455/56.1 |

*Primary Examiner*—Leslie Pascal
*Attorney, Agent, or Firm*—James A. Lamb

[57] ABSTRACT

A system controller (102) is for scheduling outbound signal transmissions in a radio communication system (100). A scheduled memory (414) is for storing a set of messages. A best cell means (430) is for determining a best power level and a best cell transmitter associated with each message in the set of messages. The best power level reliably communicates each message at a minimum required power level. A scheduling means (416) is coupled to the best cell means (430) and the scheduled memory (414) and is for generating an initial schedule of transmission times of the set of messages and improving the initial schedule. A cell site controller (402) is for controlling transmissions of a set of outbound signals from the plurality of cell transmitters according to the transmission times stored in the scheduled memory (414).

42 Claims, 16 Drawing Sheets

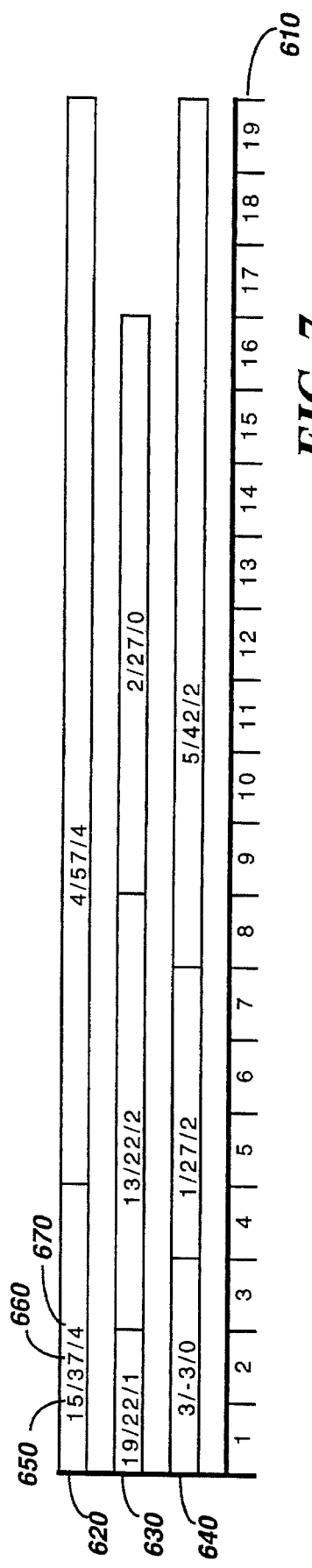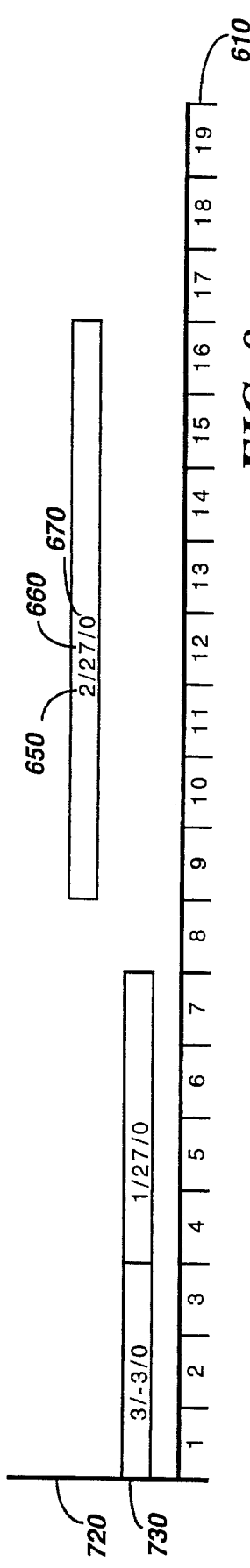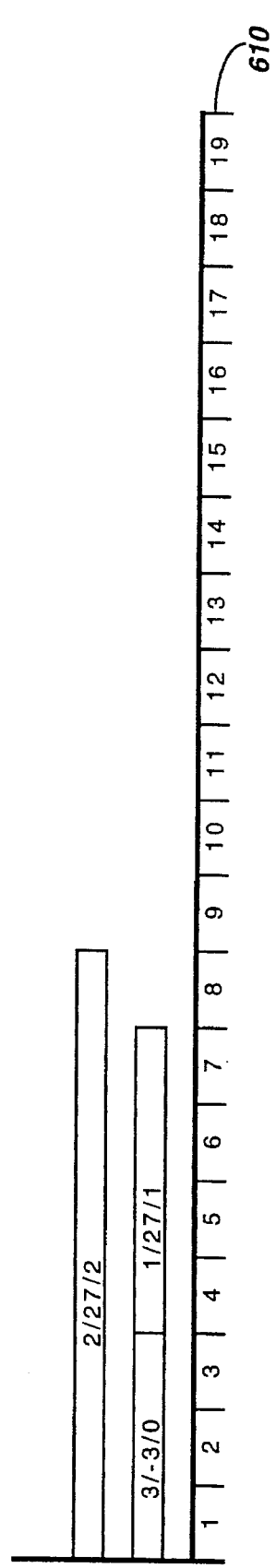

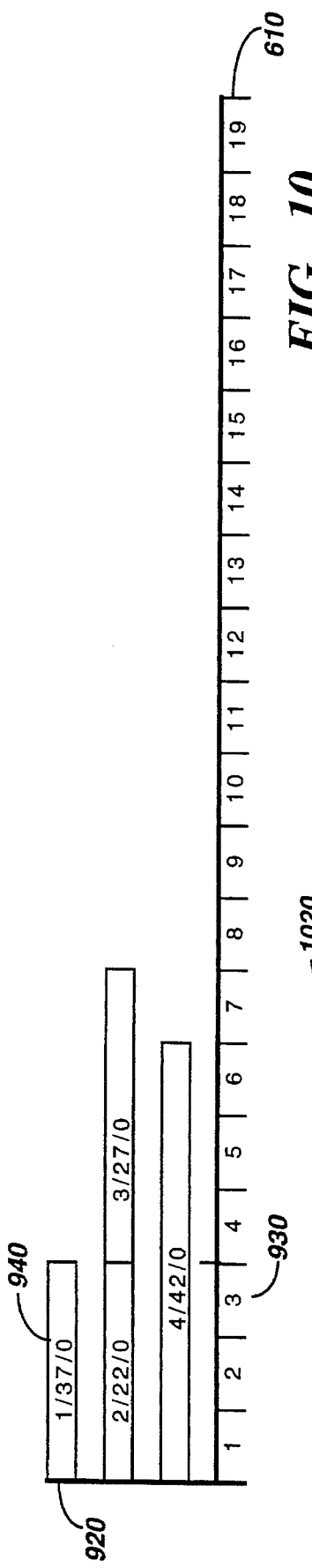
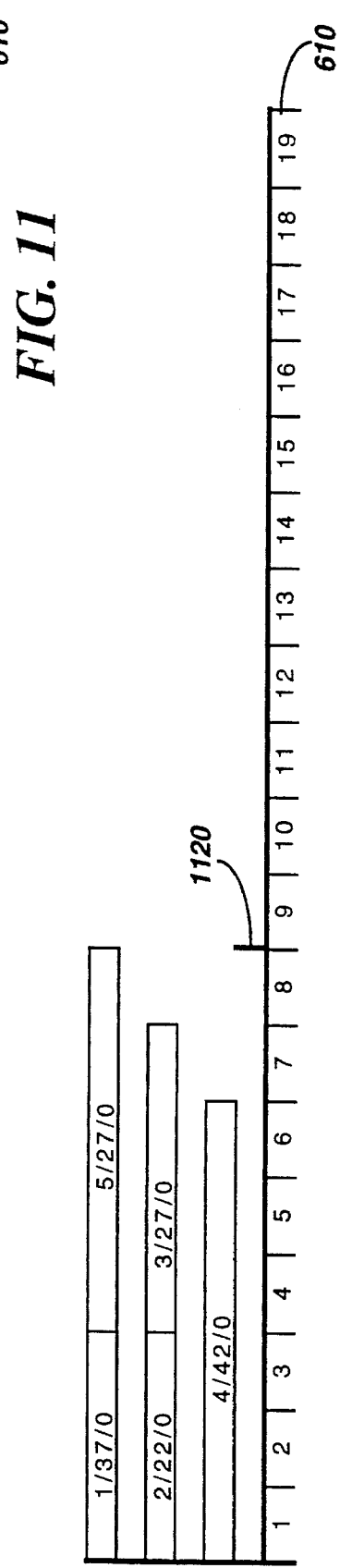

1

METHOD AND APPARATUS FOR MESSAGE SCHEDULING IN A MULTI-SITE DATA RADIO COMMUNICATION SYSTEM

FIELD OF THE INVENTION

This invention relates in general to outbound message scheduling in a data radio communication system and in particular to improving throughput in the multi-site data radio communication system by improving frequency reuse scheduling methods and apparatus.

BACKGROUND OF THE INVENTION

A known technique of maximizing the use of radio spectrum in multi-site radio communication systems is frequency reuse. In cellular systems, for example, frequencies are reused by arranging transmitter/receiver sites into reuse clusters, each of which establishes simultaneous links to subscriber units on different frequencies. This typically requires at least three duplex radio channels (each channel having two carrier frequencies, one inbound and one outbound), with some systems using more. In some wide area data radio communication systems, frequency reuse is also employed. A technique for reuse in a single duplex channel, multi-site data radio communication system is described in U.S. Pat. No. 4,670,906, entitled "Data Communication System Transmitter Selection Method and Apparatus" by Thro, issued Jun. 2, 1987. In the multi-site data radio communication system described in the patent, the transmitters have a fixed power output and when multiple messages are scheduled for simultaneous transmission, some transmitters are typically not usable because co-channel interference is likely. Also, messages are scheduled one at a time, in the order in which they are accepted for delivery. While this approach to frequency reuse exhibits improved message throughput over systems which do not employ frequency reuse techniques, the efficiency of frequency reuse could be higher if multiple messages could be scheduled for transmission from more transmitters.

Thus, what is needed is an improved technique for scheduling multiple messages for simultaneous, frequency reuse transmission from multiple transmitter sites in a multi-site data radio communication system.

SUMMARY OF THE INVENTION

Accordingly, in a first aspect of the present invention, a method is for scheduling transmission times of outbound signal transmissions in a radio communication system. The radio communication system includes a system controller, a plurality of cell transmitters which transmit outbound signals, and a plurality of selective call transceivers which transmit inbound signals. Each outbound signal includes at least one message intended for one of the plurality of selective call transceivers. The method is used in the system controller and includes the steps of selecting a set of messages, determining a best power level and a best cell transmitter, scheduling transmission times of the set of messages, and controlling transmission of a set of outbound signals.

In the step of selecting a set of messages from a queue of messages, a set of messages are selected which are queued for delivery to at least one of the plurality of selective call transceivers. Each message in the queue of messages is associated with one of the plurality of selective call transceivers and has a duration. In the step of determining a best power level and a best cell transmitter, a best power level and a best cell transmitter associated with each message in the set of messages are determined. The best power level is determined for use at the best cell transmitter to reliably communicate each message to one of the plurality of selective call transceivers at a minimum required power level. In the step of controlling transmission of a set of outbound signals, the transmission of a set of outbound signals including the set of messages from the plurality of cell transmitters is controlled according to the transmission times scheduled in the step of scheduling transmission times. Accordingly, in a second aspect of the present invention, a system controller is for scheduling transmission times of outbound signal transmissions in a radio communication system. The radio communication system includes a system controller, a plurality of cell transmitters which transmit outbound signals, and a plurality of selective call transceivers which transmit inbound signals. Each outbound signal includes at least one message intended for one of the plurality of selective call transceivers. The system controller includes a queue memory, message selection means, a scheduled memory, best cell means, scheduling means, and a cell site controller.

The queue memory is for storing a queue of messages which are queued for delivery to at least one of the plurality of selective call transceivers. Each message in the queue memory is associated with one of the plurality of selective call transceivers and has a duration. The message selection means is coupled to the queue memory and is for selecting a set of messages from the queue memory. The scheduled memory is coupled to the message selection means for storing the set of messages. The best cell means is for determining a best power level and a best cell transmitter associated with each message in the set of messages. The best power level is determined for use at the best cell transmitter to reliably communicate each message to one of the plurality of selective call transceivers at a minimum required power level. The scheduling means is coupled to the best cell means and the scheduled memory and is for scheduling transmission times of the set of messages. The cell site controller is coupled to the queue memory, the scheduled memory, and the plurality of cell transmitters. The cell site controller is for controlling transmissions of a set of outbound signals from the plurality of cell transmitters according to the transmission times stored in the scheduled memory. The set of outbound signals include the set of messages stored in the scheduled memory.

Accordingly, in a third aspect of the present invention, a method is for scheduling transmission times of outbound signal transmissions in a radio communication system. The radio communication system includes a system controller, a plurality of cell transmitters which transmit outbound signals, a plurality of cell receivers, and a plurality of selective call transceivers which transmit inbound signals. Each outbound signal includes at least one message intended for one of the plurality of selective call transceivers. The method is used in the system controller and includes the steps of selecting a set of messages, determining a best power level and a best cell transmitter, scheduling transmission times of the set of messages, and transmitting a set of outbound signals.

In the step of selecting a set of messages, a set of messages is selected from a queue of messages which are queued for delivery to at least one of the plurality of selective call transceivers. Each message in the queue of messages is associated with one of the plurality of selective call transceivers and has a duration. In the step of determining the best power level and the best cell transmitter, the best power level and the best cell transmitter are associated with each message in the set of messages. The best power level is determined for use at the best cell transmitter to reliably communicate each message to one of the plurality of selective call transceivers at a minimum required power level. In the step of transmitting a set of outbound signals, a set of outbound signals including the set of messages from the plurality of cell transmitters is transmitted according to the transmission times scheduled in the step of scheduling transmission times.

The step of determining the best power level and the best cell transmitter includes the steps of assembling a set of signal strengths obtained from a plurality of inbound signals, determining a plurality of outbound path losses, and calculating the best cell transmitter and the best power level. Each outbound path loss is for a path from a cell transmitter to a selective call transceiver, and the outbound path loss is determined from the set of signal strengths. In the step of calculating the best cell transmitter and the best power level, the best cell transmitter and the best power level are calculated for each of the plurality of selective call transceivers based on the plurality of outbound path losses.

The step of scheduling transmission times of the set of messages includes the steps of generating an initial schedule comprising a plurality of cell subsets of the set of messages and improving the initial schedule generated in the step of generating an initial schedule.

BRIEF DESCRIPTION OF THE DRAWINGS

FIG. 7 and FIG. 8 show timing diagrams of the messages being scheduled for transmission from the plurality of cell transmitters of the radio communication system, in accordance with the preferred embodiment of the present invention.

FIG. 9 shows a timing diagram of the messages being scheduled for transmission from the plurality of cell transmitters of the radio communication system, in accordance with the preferred embodiment of the present invention.

FIGS. 10 and 11 show timing diagrams of the messages being scheduled for transmission from the plurality of cell transmitters of the radio communication system, in accordance with the preferred embodiment of the present invention.

FIGS. 12 and 13 show timing diagrams of the messages being scheduled for transmission from the plurality of cell transmitters of the radio communication system, in accordance with the preferred embodiment of the present invention.

DETAILED DESCRIPTION OF THE DRAWINGS

Figure 1:
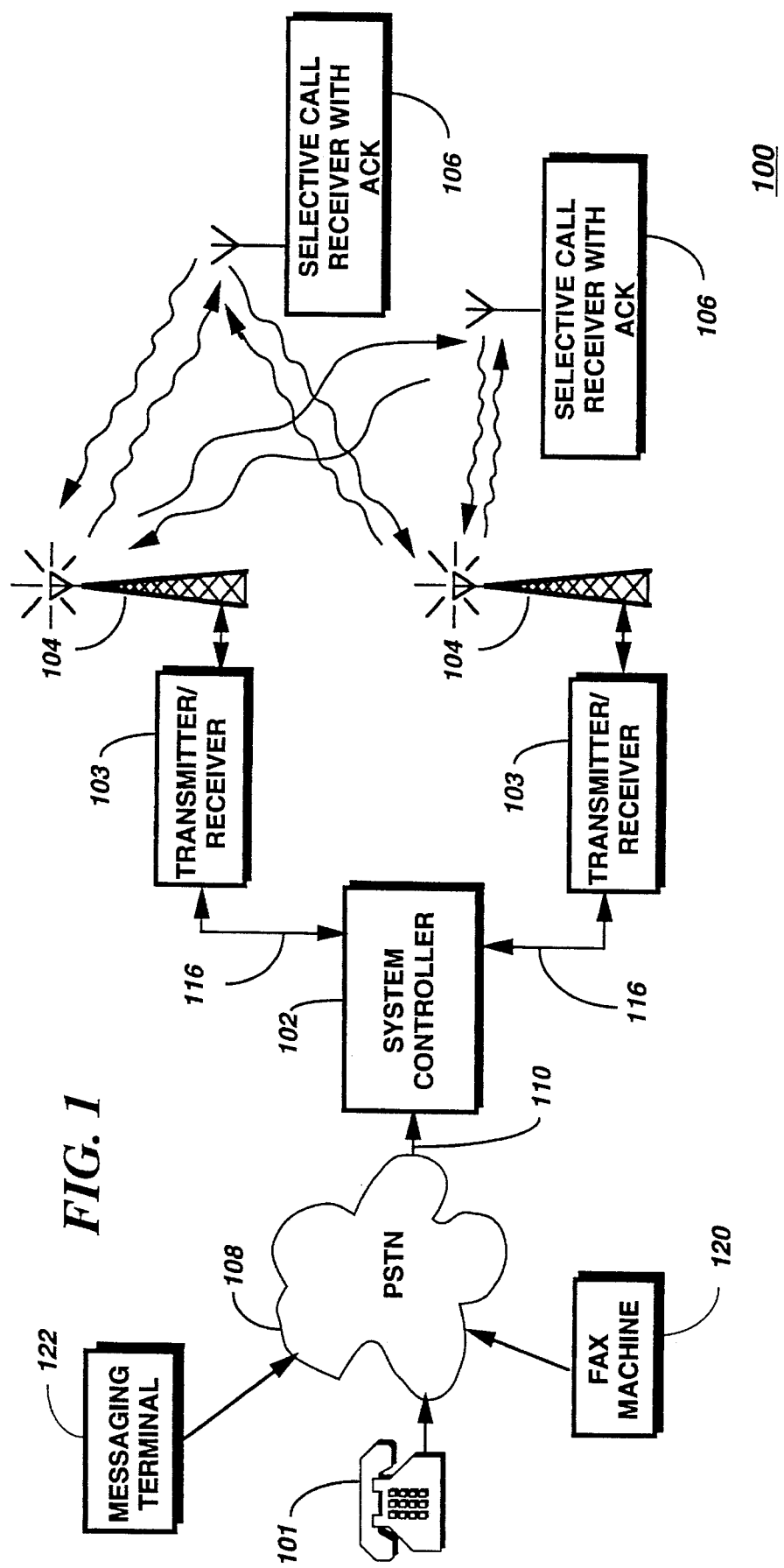
FIG. 1 shows an electrical block diagram of a radio communication system, in accordance with the preferred embodiment of the present invention.

Referring to FIG. 1, an electrical block diagram of a radio communication system 100 is shown in accordance with the preferred embodiment of the present invention. The radio communication system 100 comprises a message input device, such as a conventional telephone 101, a facsimile machine 120 or a messaging terminal 122, connected through a conventional switched telephone network (STN) 108 by conventional links 110 to a system controller 102. The system controller 102 oversees the operation of a plurality of radio frequency transmitter/receivers 103, through one or more communication links 116, which typically are twisted pair telephone wires, and additionally can include RF, microwave, or other high quality audio communication links. The system controller 102 encodes and decodes inbound and outbound telephone addresses into formats that are compatible with land line message switch computers. The system controller 102 also functions to encode and schedule outbound messages, including digitized audio messages and data messages, for transmission by the radio frequency transmitter/receivers 103 to a plurality of selective call transceivers 106. The system controller 102 further functions to decode inbound messages, including acknowledgments and data messages, received by the radio frequency transmitter/receivers 103 from the plurality of selective call transceivers 106. The inbound and outbound messages are included in outbound radio signals transmitted from and inbound radio signals received by a conventional antenna 104 coupled to the radio frequency transmitter/receiver 103.

It should be noted that the system controller 102 is capable of operating in a distributed transmission control environment that allows mixing conventional cellular, simulcast, satellite, or other coverage schemes involving a plurality of radio frequency transmitter/receivers 103, conventional antennas 104, for providing reliable radio signals within a geographic area as large as a worldwide network.

It will be appreciated that the selective call transceivers 106 include radio terminal devices such as pagers having acknowledge back capability, conventional mobile and portable cellular telephones, mobile data radio terminals, mobile cellular telephones having attached data terminals, and mobile radios (trunked and non-trunked) having data terminals attached. Each of the selective call transceivers 106 assigned for use in the radio communication system 100 has an address assigned-thereto which is a unique selective call address. The address enables the transmission of a message from the system controller 102 only to the addressed selective call transceiver 106, and identifies messages and responses received at the system controller 102 from the selective call transceiver. The selective call transceivers 106 are each characterized by a predetermined receiving sensitivity, $C(t_j)$, which is measured in dBmW, and wherein ($t_j$) represents one of the plurality of selective call transceivers 106. The predetermined-receiving sensitivity, $C(t_j)$, is the minimum received signal power level at which an outbound signal having a predetermined symbol rate and signaling scheme is reliably recovered, as is well known to one of ordinary skill in the art. The selective call transceivers 106 are each further characterized by a predetermined co-channel interference ratio, $S/I(t_j)$, which is measured in dB. The predetermined co-channel interference ratio, $S/I(t_j)$, is the minimum ratio of received signal power level to the power level of an interfering signal for which an outbound signal having a predetermined symbol rate and signaling scheme is reliably recovered in the presence of interference, as is well known to one of ordinary skill in the art. When an outbound signal is stronger than $C(t_j)$ at a receiver of the selective call transceiver 106, and when the interference ratio is greater than $S/I(t_j)$, the outbound signal is received by the selective call transceiver 106, $t_j$, with an acceptable (typically very low) error rate.

Figure 2:
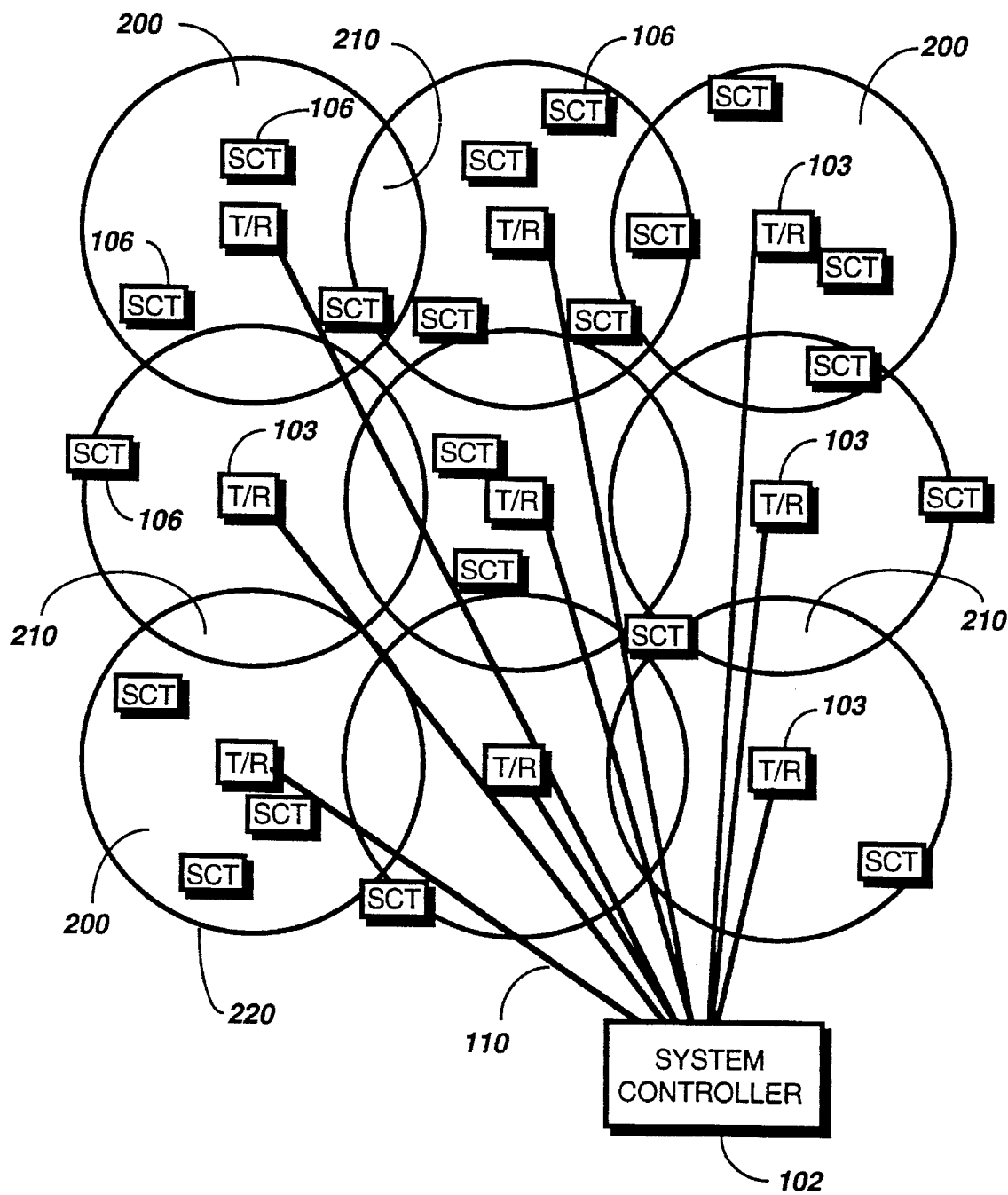
FIG. 2 shows a pictorial diagram depicting communications cells of the selective call radio communication system during a simulcast transmission, in accordance with the preferred embodiment of the present invention.

Referring to FIG. 2, a pictorial diagram depicting communications cells 200 of the selective call radio communication system 100 during a simulcast transmission is shown, in accordance with the preferred embodiment of the present invention. The approximate coverage periphery of each communication cell 200 is represented by a circular boundary 220. Messages are queued in the system controller 102 for delivery to a plurality of selective call transceivers 106. In each communication cell 200, one transmitter/receiver 103 is shown by way of example. Each transmitter/receiver 103 comprises a conventional cell transmitter and a conventional cell receiver. A radio communication antenna 104 (not shown in FIG. 2) is associated with each transmitter/receiver 103 and comprises a conventional transmit antenna and a conventional receive antenna. The power level of the cell transmitter is controllable by the system controller 102, and can be set to different values for different messages. Each cell transmitter has a maximum power level at which signals can be sent. Each receive antenna is located sufficiently close to the corresponding transmit antenna such that the average power level of an inbound signal received by the receive antenna can be used as an indicator of a path loss of a signal path from the transmit antenna to the selective call transceiver 106.

Coverage overlap regions 210 are regions of the communication system 100 wherein radio signals are typically received by selective call transceiver 106 located therein, simultaneously from transmitter/receivers 103 located in different communication cells 200. These overlap regions 210 are regions where the capture effect, well known in the art of FM radio communications, does not normally occur reliably from any one of the transmitter/receivers 103, because the signals are often of similar strength. It will be appreciated that when simulcast transmission is used, a common outbound radio signal is transmitted from all communication cells 200 and thus the radio signals in the overlap region are being modulated with identical data symbols. The timing of transmissions is adjusted so that the data symbols received in an overlap region 210 are substantially simultaneous to within a small part of one information symbol. Thus, when outbound signals arrive at a selective call transceiver 106 from two transmitter/receivers 103 in an overlap region 210, symbols in the signals can be recovered. Other techniques well known to one of ordinary skill in the art, such as carrier frequency offsetting and error correcting codes, are used to maximize the recovery of the symbols, and therefore the coverage efficiency of the system during simulcast outbound signal transmissions. It will be further appreciated that, for simulcast transmissions, the coverage peripheries 220 are sufficiently overlapped so that there are no "holes" between cells where a signal can arrive which has a strength less than the minimum needed to assure recovery of the outbound signal.

It will be appreciated that the use of circles as the cell coverage periphery 220 is a simplification of the actual coverage peripheries found in typical systems, and which does not substantially affect the conclusions of this system description. It will be further appreciated that, while the circles in FIG. 2 are shown as all having the same diameter, indicating that equal transmit power is used by all cell transmitters, differing transmit powers can be used in a simulcast system, such as a cell transmitter positioned and transmitting at a low power to "fill in a hole" of coverage.

Figure 3:
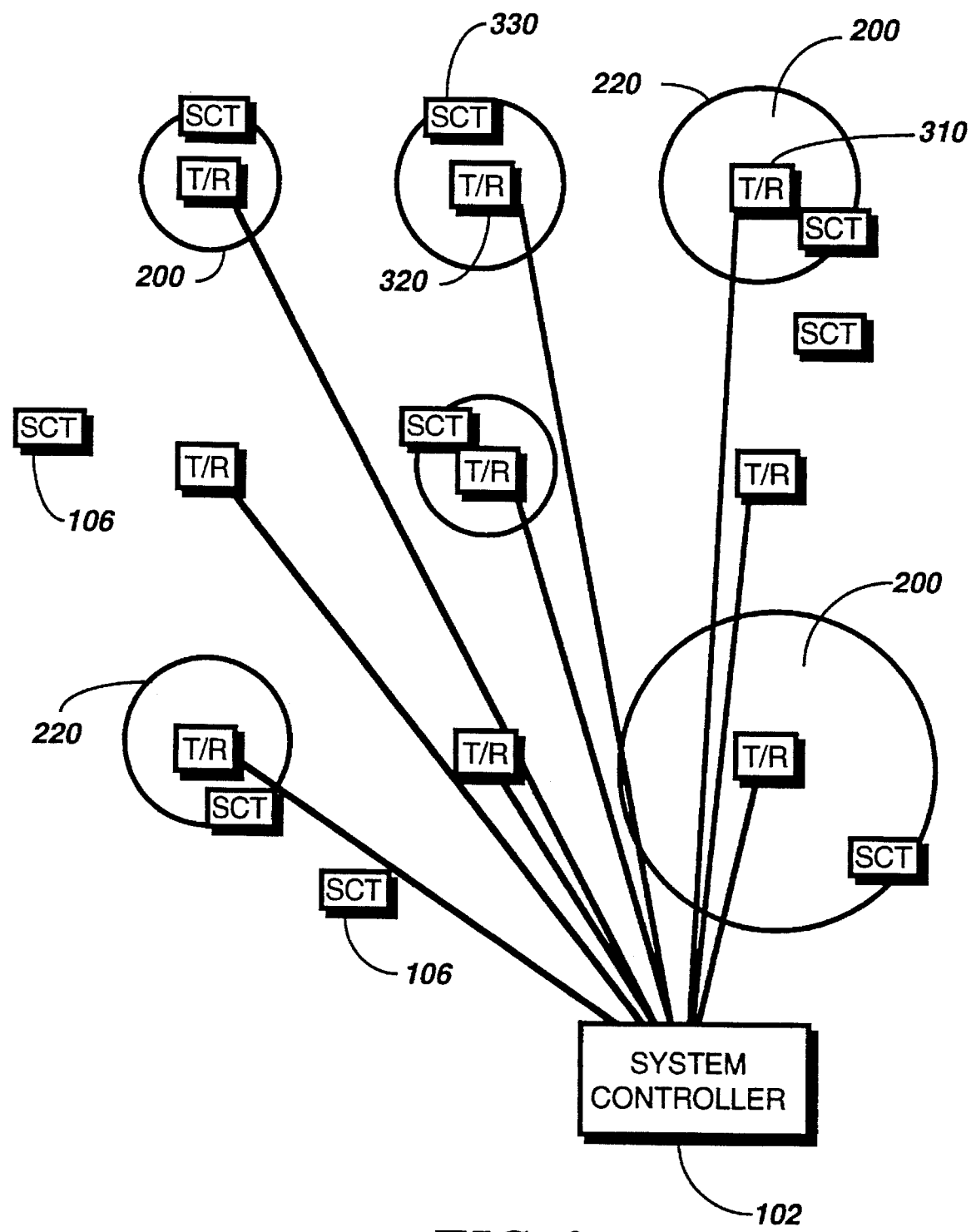
FIG. 3 shows a pictorial diagram depicting the communication cells of the selective call radio communication system at a time during an idealized frequency reuse transmission, in accordance with the preferred embodiment of the present invention.

Referring to FIG. 3, a pictorial diagram depicts the communication cells 200 of the selective call radio communication system 100 at a time during an idealized frequency reuse transmission, in accordance with the preferred embodiment of the present invention. During idealized frequency reuse, a minimum power level necessary to accomplish reliable communication of each message in a set of messages is determined as described in detail herein below, which determination results in a best cell transmitter and power level associated with each message. Differing power levels result in differing sizes of coverage peripheries for different cells 200, as illustrated in FIG. 3. Then, the set of messages is scheduled. Each message has a duration and has a transmission time, which is the time at which the transmission of the message begins. The goal of the scheduling is to schedule a transmission time and best power level for each message such that the total transmission time for the transmission of set of messages and the probability of delivery of the messages is maximized. It will be appreciated that such scheduling also tends to maximize simultaneous message transmissions from the plurality of cells 200. The transmission of a plurality of messages having differing power levels are shown in FIG. 3 at an instant when portions of six messages are being transmitted simultaneously to six selective call transceivers 106, while three cell transmitters are not transmitting, in order to prevent interference. It will be appreciated that the coverage peripheries 220 shown in FIG. 3, each of which represents the power level necessary to communicate reliably with one selective call transceiver 106, do not represent the potential for interference by a signal from a first cell transmitter 310 with a signal from a second transceiver 320 at a second selective call transceiver 330. It will thus be appreciated that optimization of the scheduling of messages for a frequency reuse radio communication system 100 is a multi-dimensional problem involving the interference between messages, the identification (or address) of a selective call transceiver 106 intended to receive each message, the duration of each message, and the transmission time of each message.

It will be appreciated that the radio communication system can be either a simulcast communication system or a conventional system wherein simulcast timing refinements are not necessarily undertaken, and wherein messages intended for a large number of selective call transceivers 106 are typically sent from the plurality of transmitter/receivers 103 in sequence from a few predetermined subsets of the plurality of transmitter/receivers 103 selected to avoid overlapping coverage areas.

The method and apparatus described herein, below, provide for scheduling transmission times of outbound signal transmissions in the radio communication system 100, wherein the radio communication system 100 comprises the system controller 102, a plurality of cell transmitters which transmit outbound signals, a plurality of cell receivers, and a plurality of selective call transceivers 106 which transmit inbound signals, and wherein each outbound signal comprises at least one message intended for one of the plurality of selective call transceivers 106. A summary of the functions performed, which are described in more detail below, is as follows. A set of messages is selected from a queue of messages which are queued for delivery to one or more of the selective call transceivers 106. Each message in the queue of messages is intended for and associated with one of the selective call transceivers and has a duration associated therewith. A best power level and a best cell transmitter is determined and associated with each message in the set of messages. The best power level is calculated for use at a cell transmitter determined to be the best cell transmitter. When the best transmitter and best power level are used, the message will be communicated to the intended selective call transceiver 106 with the best reliability. The best power level and best transmitter are determined by assembling a set of signal strengths preferably obtained from measurements made by selective call transceivers of outbound signals and reported to the system controller in inbound acknowledgments or messages. Then a plurality of outbound path losses are determined, each outbound path loss being for a path from a cell transmitter to a selective call transceiver. Each outbound path loss is determined from one of the set of signal strengths, a predetermined sensitivity of the selective call transceiver 106, and the power level of the cell transmitter which transmitted the outbound signal which was measured and reported.

Having established path losses for all selective call transceivers 106 intended to receive one of the set of messages, transmission times of the set of messages are then scheduled. An initial schedule is generated by identifying cell subsets of the set of messages, each of which is common to one best cell transmitter. Then the transmission times of the messages in each cell subset are scheduled so that the messages would be transmitted sequentially, first in order of the best power level used for each message, and then in order of duration of the messages.

The initial schedule is then improved in four stages. The first stage is to remove messages to a non-scheduled subset of messages. The messages removed are messages which are calculated to interfere with other messages in other cell subsets. For each interference determination, two path losses are calculated. The messages are removed in a prescribed order which minimizes the number of messages so removed. The prescribed order is in order of messages which interfere most with other messages. The second stage is to determine, in all cell subsets from which messages have been removed, messages scheduled for later transmission which can be advanced to replace periods of time made available by the removed messages. Messages which are advanced are tested for interference with other messages in other cell subsets, and retarded when interference is found by the testing.

The third stage is to select messages from the non-scheduled subset and append them consecutively after the last message in each cell subset corresponding to the best cell transmitter of the selected messages. Each selected message is tested for interference and removed to the non-scheduled subset when interference is found. The fourth stage is to append all messages remaining in the non-scheduled subset to each corresponding cell subset, with the messages appended in this fourth stage being scheduled for transmission consecutively starting at the latest message ending time of all the messages heretofore scheduled in the cell subsets. The correspondence referred to above is, again, correspondence between the best cell transmitter of the cell subset and the message being appended. The messages in each subset are appended first in order of best power level, then in order of duration. These four stages of improving the schedule, which rely upon the best power levels and best transmitters which have been previously determined, provide a schedule for frequency reuse transmission of the messages which improves the throughput of outbound message delivery over the initial schedule, the amount of improvement depending upon the particular characteristics of the set of messages chosen.

A set of outbound signals are transmitted, comprising the set of messages from the plurality of cell transmitters according to the scheduled transmission time. A new set of messages can then be scheduled for delivery. The scheduling of the new set of messages may be started before the completion of a set in process, to provide maximum throughput.

Figure 4:
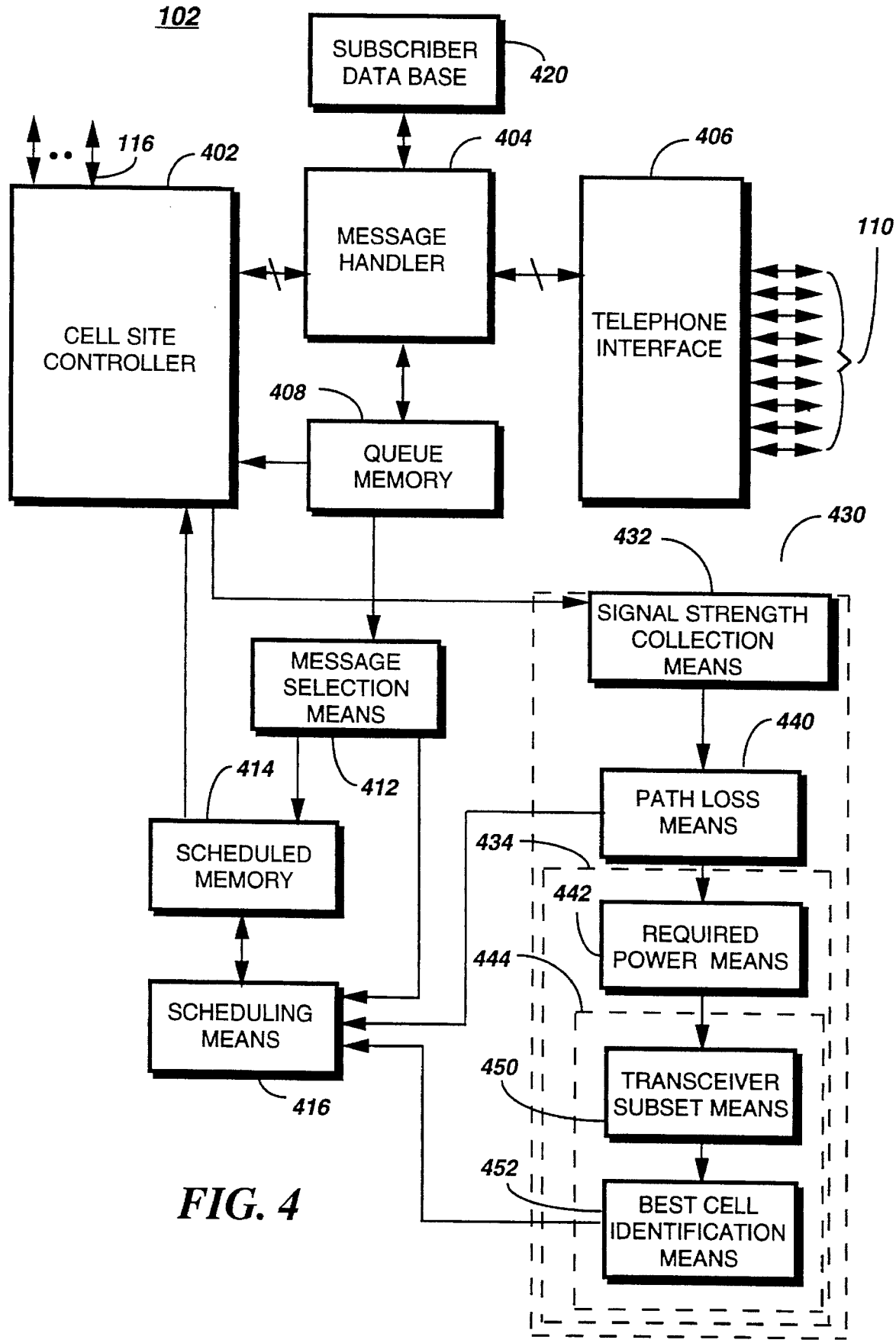
FIG. 4 shows an electrical block diagram of the system controller, in accordance with the preferred embodiment of the present invention.

Referring to FIG. 4, an electrical block diagram of the system controller 102 is shown, in accordance with the preferred embodiment of the present invention. The system controller 102 comprises a cell site controller 402, a message handler 404, a queue memory 408, a subscriber data base 420, a telephone interface 406, message selection means 412, a scheduled memory 414, scheduling means 416, and best cell means 430. The cell site controller 402 queues data and stored voice messages for transmission to the selective call transceivers 106, and receives acknowledgments, and data messages from the selective call transceivers 106. The cell site controller 402 is coupled to the radio frequency transmitter/receiver 103 (FIG. 1) by the links 116. The message handler 404, which routes and processes messages, is coupled to the cell site controller 402 and is further coupled to the telephone interface 406, the subscriber data base 420, and the queue memory 408. The telephone interface 406 handles the switched telephone network 108 (STN) (FIG. 1) physical connection, connecting and disconnecting telephone calls at the telephone links 110, and routing the audio signals between the phone links and the message handler 404. The subscriber data base 420 stores information for each subscriber, including a correlation between the unique address assigned to each selective call receiver and the telephone number used within the STN 108 to route messages and telephone calls to each selective call receiver, as well as other subscriber determined preferences, such as hours during which messages are to be held back from delivery to the selective call unit. The subscriber data base further stores the predetermined characteristics, C(t) and S/I(t) for each subscriber unit, or selective call transceiver, $t_j$. The queue memory 408 is for storing a queue of messages which are queued for delivery to at least one of the plurality of selective call transceivers 106, wherein each message of the plurality of messages is associated with a selective call address, $t_j$, of one of the plurality of selective call transceivers and a duration. The duration is the duration of the message, which preferably is a count of predetermined time slots required to transmit the message. It will be appreciated that, alternatively, the duration can be measured in other terms equally well, such as seconds or message blocks. The selective call address is the identification of the selective call transceiver 106 from which the message or acknowledgment has been received, or to which the data message or digitized audio message is to be sent. An example of a portion of the contents of the queue memory 408 is shown in Table 1. In addition to the message, the ID of the selective call transceiver 106 associated with the message, and the duration associated with the message, a message number is also associated with each message. The message number is assigned by the message handler 404 for tracking the message until the message is discarded from the system controller 102. It will be appreciated that the message number is advantageous, but not required. For example, the message number could alternatively be an address location of the message in the queue memory 408. Nine messages are shown in Table 1, but it will be recognized that in a large data communication system, hundreds of messages could possibly be queued up for delivery Over a short period of time.

TABLE 1

| Message Number | Message | Selective Call Transceiver ID | Duration |
| --- | --- | --- | --- |
| 1 | Call home at 3 PM | 12 | 4 |
| 2 | Yankees at bat . . . | 12 | 8 |
| 3 | MOT 54-3/8 | 23 | 3 |
| 4 | Meetings for 10/14: . . . | 34 | 15 |
| 5 | Urgent: Call 305-344-1 . . . | 12 | 12 |
| 13 | Your brother is here. | 23 | 6 |
| 15 | Call the library. | 34 | 4 |
| 19 | 364-2721 | 12 | 2 |
| 31 | Four score and . . . | 45 | 34 |

The message selection means 412 is coupled to the queue memory 408 and is for selecting a set of messages from the queue memory 408. The selection preferably is based on a maximum number of messages, but alternatively may be based on other criteria, as, for example, a maximum total duration of the messages selected. The scheduled memory 414 is coupled to the message selection means 412 and is for storing the selected set of messages while the scheduling means 416 performs the scheduling of the messages. Continuing the example shown in Table 1, the contents of the scheduled memory 414 are shown in Table 2. In this example, the set of messages in the scheduled memory 414 includes eight of the nine messages in the queue memory 408. It will be appreciated that separating the queue and scheduled memories is a technique for isolating the messages which are to be scheduled. For example, the messages not initially selected as part of the set of messages (message number 31 in this example) and any additional messages which are received and added to the queue memory 408 by the message handler 404 while the set of messages are being scheduled preferably are not added to the set of messages. Having a separate scheduled memory 414 simplifies the scheduling process.

TABLE 2

| Message Number | Selective Call Transceiver ID | Duration |
| --- | --- | --- |
| 1 | 12 | 4 |
| 2 | 12 | 8 |
| 3 | 23 | 3 |
| 4 | 34 | 15 |

TABLE 2-continued

| Message Number | Selective Call Transceiver ID | Duration |
| --- | --- | --- |
| 5 | 12 | 12 |
| 13 | 23 | 6 |
| 15 | 34 | 4 |
| 19 | 12 | 2 |

The best cell means 430 is coupled to the cell site controller 402 and the scheduling means 416 and is for determining a best power level and a best cell transmitter associated with each message in the set of messages. The best power level is determined for use at the best cell transmitter to reliably transmit each message to one of the plurality of selective call transceivers at a minimum required power level as described in detail herein below. The scheduling means 416 is coupled to the scheduled memory 414 and the best cell means 430, and is for determining a schedule for frequency re-use transmission of the set of messages from the plurality of cell transmitters. The schedule comprises the transmission times of the messages in the set of messages stored in the scheduled memory 414. The cell site controller 402 is coupled to the queue memory 408 and the scheduled memory 414, and is for controlling transmissions of the outbound signals from the plurality of cell transmitters according to the transmission times stored in the scheduled memory 414, wherein the outbound signals comprise the set of messages stored in the queue memory 408.

The best cell means 430 comprises the signal strength collection means 432, the path loss means 440, and the best cell analysis means 434. The signal strength collection means 432 is coupled to the cell site controller 402, and is for assembling and storing a set of signal strengths which are obtained from a plurality of inbound signals received at the plurality of cell receivers as described in detail herein below. Each signal strength obtained is indicative of two average signal strength values, preferably in decibels referenced to milliWatts (dBmW), of an outbound signal recently received by one of the plurality of selective call transceivers 106, from one of the plurality of cell transmitters. The path loss means 440 is coupled to the signal strength collection means 432, and is for determining an outbound path loss for one of a plurality of cell paths between a transmitter and a selective call transceiver. Each outbound path loss is determined from one of the values in the set of signal strengths. It will be appreciated that, based on a frequency of usage of a selective call transceiver 106 and movement of the selective call transceiver 106 between usages, there can be a plurality of recent outbound path losses pertaining to each selective call transceiver 106. The best cell analysis means 434 is coupled to the path loss means 440 and the scheduling means 416, and is for calculating the best cell transmitter and the best power level for each of the plurality of selective call transceivers 106 based on the plurality of outbound path losses, as well as other parameters, as more fully described below.

In accordance with the preferred embodiment of the present invention, the signal strength includes two values determined by measurements made within the selective call transceiver 106 during receipt of outbound signals. The selective call address, or identification (ID), of the selective call transceiver, is hereafter designated as "$t_j$" for a specific selective call transceiver, or "t" for an undesignated selective call transceiver 106. Each of the outbound signals which is measured by the selective call transceiver 106 includes an identification of the cell transmitter, hereafter designated as "$c_i$" for a specific cell transmitter, or "c" for an undesignated cell transmitter. The two values determined by the measurements are a average maximum signal strength of the outbound signal power, $X_m(c_i,t_j)$ and a average minimum strength of the outbound signal power, $X_n(c_i,t_j)$, which collectively are the signal strength, $X(c_i,t_j)$, determined in dBmW. The signal strength, $X(c_i,t_j)$, comprising $X_m(c_i,t_j)$ and $X_n(c_i,t_j)$, and the cell transmitter, $c_i$, are reported in an inbound signal by the selective call transceiver 106 and assembled by the signal strength collection means. The average maximum signal strength, $X_m(c_i,t_j)$ is an average of the highest 15% of the measurements made by the selective call transceiver 106. The average minimum signal strength, $X_n(c_i,t_j)$ is preferably an average of the lowest 15% of the measurements made by the selective call transceiver 106. It will be appreciated that alternative methods could be used to determine $X_m(c,t)$ and $X_n(c,t)$ without substantially affecting the improvements provided by the method and apparatus described in accordance with the preferred embodiment of the present invention. For example, the highest and lowest 10% of the measurements could alternatively be used, or the measurements could be analyzed as random measurements of a predetermined random process having predetermined parameters, such as a Rayleigh distributed process to determine the average minimum and maximum values. Means for measuring the signal power of a received signal are well known to one of ordinary skill in the art. One such measurement means is described in U.S. Pat. No. 4,670,906, entitled "Data Communication System Transmitter Selection Method and Apparatus" by Thro, issued on Jun. 2, 1987, assigned to the assignee of this patent application, and incorporated herein by reference. It will be appreciated that each inbound signal can be received at more than one cell receiver. The reported signal strengths, $X(c_i,t_j)$, are communicated to the system controller 102. For each reported signal strength, an outbound path loss, $OP(c_i,t_j)$ is estimated for the corresponding cell transmitter/selective call transceiver path, $(c_i,t_j)$. The estimate is made by the path loss means 440 by subtracting the reported average minimum strength of the outbound signal power, $X_n(c_i,t_j)$ from the power level, designated $Y_x(c_i,t_j)$, used by the cell transmitter, $c_i$, during the transmission of the outbound signal which was measured by the selective call transceiver 106, $t_j$. Thus, $OP(c_i,t_j)=Y_x(c_i,t_j)-X_n(c_i,t_j)$. It will also be appreciated that, because the average minimum strength of the outbound signal power, $X_n(c_i,t_j)$ is used, the outbound path loss is calculated as a conservatively high value, which improves the reliability of delivering the set of messages. It will be further appreciated, that, for maximum system throughput, the signal strength report need be included only in certain types of inbound signals. For example, the signal strength can be excluded from inbound signals for a period of time after a signal strength is included, unless a command is received to respond with the most recent signal strength measurement.

In accordance with an alternate embodiment of the present invention, inbound signals do not include the signal strength information as described above. As a substitute for measuring the signal strength within the selective call transceiver 106, a signal strength of an inbound signal is measured at cell receivers. The signal strength received at the cell receiver, hereafter designated as $R(c_i,t_j)$, comprises a average maximum signal strength of the inbound signal power, $R_m(c_i,t_j)$ and an average minimum strength of the inbound signal power, $R_n(c_i,t_j)$, determined in dBmW. The technique of making the measurements at the cell receiver and deterring the signal strength values is the same technique described above with respect to the selective call transceiver 106. The reported signal strengths, $R(c_i,t_j)$, are communicated to the system controller 102 and assembled by the signal strength collection means. $R_n(c_i,t_j)$, is used by the path loss means 440 to estimate the inbound path loss, hereafter designated $IP(c_i,t_j)$, by subtracting the inbound signal strength, $R_n(c_i,t_j)$, from a predetermined power level of the selective call transceiver 106. $OP(c_i,t_j)$ for the cell transmitter/selective call transceiver path, $(c_i,t_j)$ is then approximated as being equivalent to $IP(c_i,t_j)$, the approximation being in the nature of an estimation having statistical uncertainty.

Thus, in accordance with the preferred and alternative embodiments of the present invention, a set of outbound path losses, $OP(c,t)$ is obtained from a plurality of inbound signals.

The best cell analysis means 434 comprises required power means 442 and best cell selection means 444. The required power means 442 is coupled to the path loss means 440 and is for determining a required power level for each cell transmitter/selective call transceiver path, $(c_i,t_j)$. The required power level, which is designated by $Y(c_i,t_j)$, is determined by the sum of $OP(c_i,t_j)$ and $C(t_j)$, unless the sum exceeds the maximum power level of the cell transmitter, hereafter designated $P_{max}(c_i)$. When the sum exceeds $P_{max}(c_i)$, $Y(c_i,t_j)$ is set to $P_{max}(c_i)$.

The best cell selection means 444 is coupled to the required power means 442 and is for selecting the best cell transmitter and the best power level for one of the plurality of selective call transceivers, $t_j$. The best cell selection means 444 comprises transceiver subset means 450 and best cell identification means 452. The transceiver subset means 450 is for generating a transceiver subset. The transceiver subset comprises all required power levels, $Y(c,t_j)$, which have been determined by the required power means within a predetermined prior time period for the plurality of cell paths between a transmitter and a selective call transceiver associated with a selective call transceiver, $t_j$. The best cell identification means 452 is coupled to the transceiver subset means 450 and the scheduling means 416, and is for identifying one of the plurality of cell transmitters associated with the minimum required power level of the required power levels, $Y(c,t_j)$, as being the best cell transmitter, $t_b$, having the best power level, $Y(t_b,t_j)$ for the selective call transceiver, $t_j$. In the event more than one equivalent minimum power level exists, then one of them is chosen. Preferably, the choosing is accomplished by selecting a default best cell transmitter, either being a cell transmitter predetermined manually or by criteria such as prior best cell selections. In summary, the cell transmitter having the minimum required power level to reliably communicate a message to a selective call transceiver 106 is chosen and associated with the selective call transceiver 106.

Figure 5:
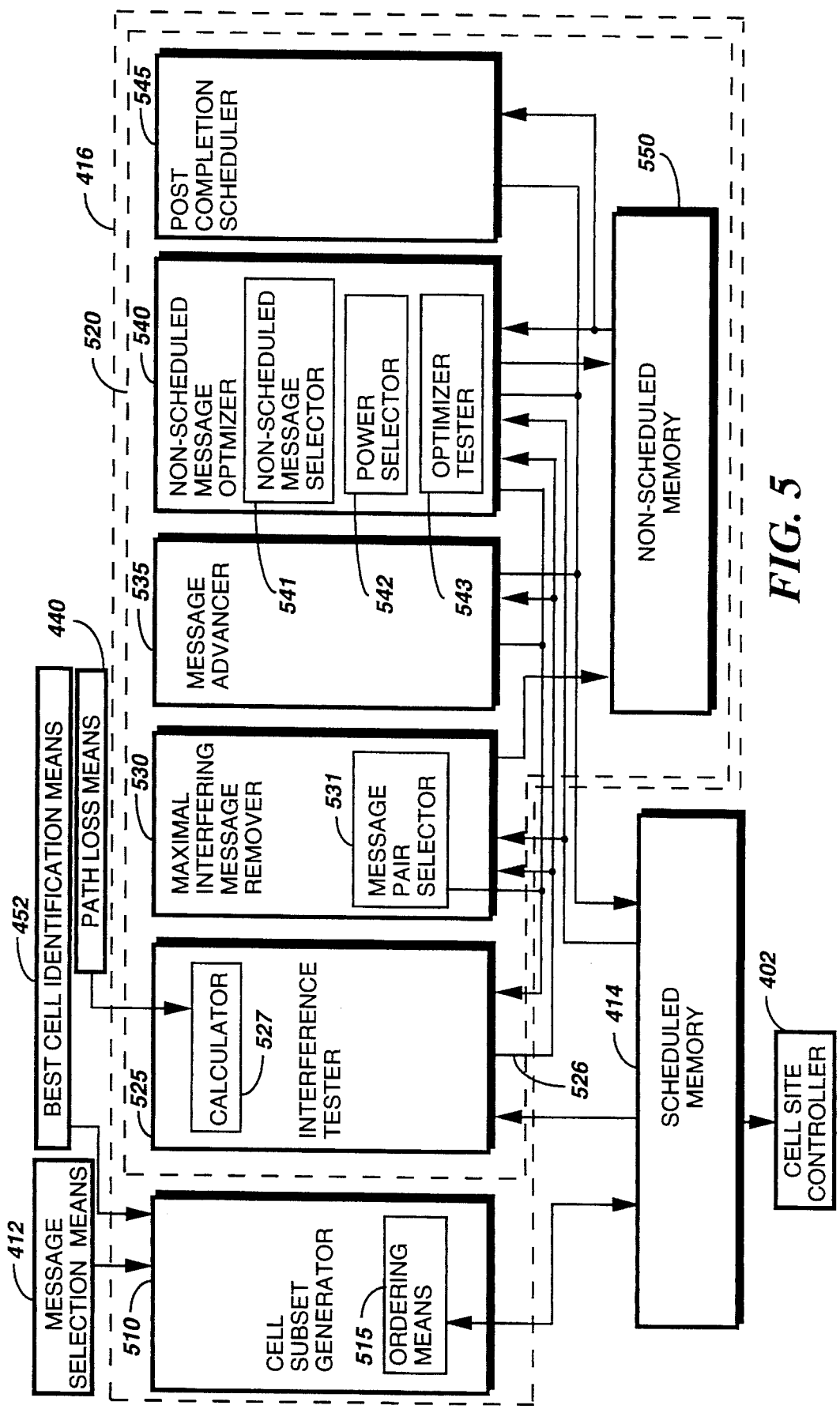
FIG. 5 shows an electrical block diagram of the scheduling means, in accordance with the preferred embodiment of the present invention.

Referring to FIG. 5, an electrical block diagram of the scheduling means 416 is shown, in accordance with the preferred embodiment of the present invention. The scheduling means 416 comprises a cell subset generator 510 and a scheduler 520. The cell subset generator 510 is coupled to the scheduled memory 414, the best cell identification means 452, and the message selection means 412, and is for generating a plurality of cell subsets of the set of messages. For each message in the set of messages, the cell subset generator 510 uses the selective call transceiver 106 associated with the message to identify the best cell transmitter and the best power level for the best cell transmitter. The identified best cell transmitter and best power level are then associated with the message. Stated more succinctly, the cell subset generator 510 associates a best cell transmitter and best power level with each message in the set of messages, based on the selective call transceiver 106 associated with each message and also associated with the best cell transmitter. The best cell transmitter and best power level are stored in the scheduled memory 414, in association with the message. The contents of the scheduled memory 414 shown in Table 2 are also shown in Table 3, after the best cell transmitter and the best power level have been associated with each message by the cell subset generator 510.

TABLE 3

| Message Number | Selective Call Transceiver $t_j$ | Duration | Best Cell Transmitter $c_i$ | Best Power Level $Y(c_i,t_j)$ dBmW |
|---|---|---|---|---|
| 1 | 12 | 4 | 3 | 27 |
| 2 | 12 | 8 | 2 | 27 |
| 3 | 23 | 3 | 3 | −3 |
| 4 | 34 | 15 | 1 | 57 |
| 5 | 12 | 12 | 3 | 42 |
| 13 | 23 | 6 | 2 | 22 |
| 15 | 34 | 4 | 1 | 37 |
| 19 | 12 | 2 | 2 | 22 |

The cell subset generator 510 further identifies one or more messages having a best cell transmitter in common as one of the plurality of cell subsets.

In accordance with the preferred embodiment of the present invention, the cell subset generator 510 comprises an ordering means 515 which is coupled to the scheduled memory 414 and is for scheduling the transmission time of each of the one or more messages in the set of messages consecutively within each of the plurality of cell subsets of messages, firstly in order of increasing value of the best power level, and secondly in order of increasing duration of each message. The contents of the scheduled memory 414 shown in Table 3 are also shown below in Table 4, after being organized into subsets by the cell subset generator 510, and after being reordered and initially scheduled by the reordering means 515. It will be appreciated that generating cell subsets need not be accomplished by physically reorganizing the contents of the scheduled memory 414, inasmuch as the members of the subsets are readily identified by the best cell transmitter. Also, the messages need not be physically reorganized when ordered. The generation of the subsets and the ordering are an approach to describing how the transmission times are initially assigned by the scheduling means 416, and make the explanation of the action of other functional blocks of the scheduling means 416 easier to describe, but are not actually done in the preferred embodiment, which uses search and sort functions to replace physical movement of the messages within the scheduled memory 414.

TABLE 4

| Cell Subset | Message Number | Selective Call Transcvr $t_j$ | Duration (slots) | Best Cell Transmitter $c_i$ | Best Power Level $Y(c_i,t_j)$ (dBmW) | Transmission Time (slot #) |
|---|---|---|---|---|---|---|
| 1 | 15 | 34 | 4 | 1 | 37 | 0 |
|   | 4 | 34 | 15 | 1 | 57 | 4 |
| 2 | 19 | 12 | 2 | 2 | 22 | 0 |
|   | 13 | 23 | 6 | 2 | 22 | 2 |
|   | 2 | 12 | 8 | 2 | 27 | 8 |
| 3 | 3 | 23 | 3 | 3 | −3 | 0 |
|   | 1 | 12 | 4 | 3 | 27 | 3 |
|   | 5 | 12 | 12 | 3 | 42 | 7 |

In accordance with an alternative embodiment of the present invention, the cell subset generator 510 comprises an ordering means 515 which is coupled to the scheduled memory 414 and which is for scheduling the transmission time of each of the one or more messages in the set of messages consecutively within each of the plurality of cell subsets of messages, in order of increasing value of the best power level.

The scheduler 520 is coupled to the scheduled memory 414 and the path loss means 440, and is for scheduling a transmission time of each message in each cell subset to generate sequential, non-overlapping messages within the cell subset which have improved likelihood of being reliably received. The scheduler 520 comprises an interference tester 525, a maximal interfering message remover 530, a message advancer 535, a non-scheduled message optimizer 540, a post-completion scheduler 545, and a non-scheduled memory 550. The interference tester 525 is coupled to the scheduled memory 414 and the path loss means 440 and is for testing message pairs for interference, wherein a message pair comprises a first message and a second message.

Figure 6:
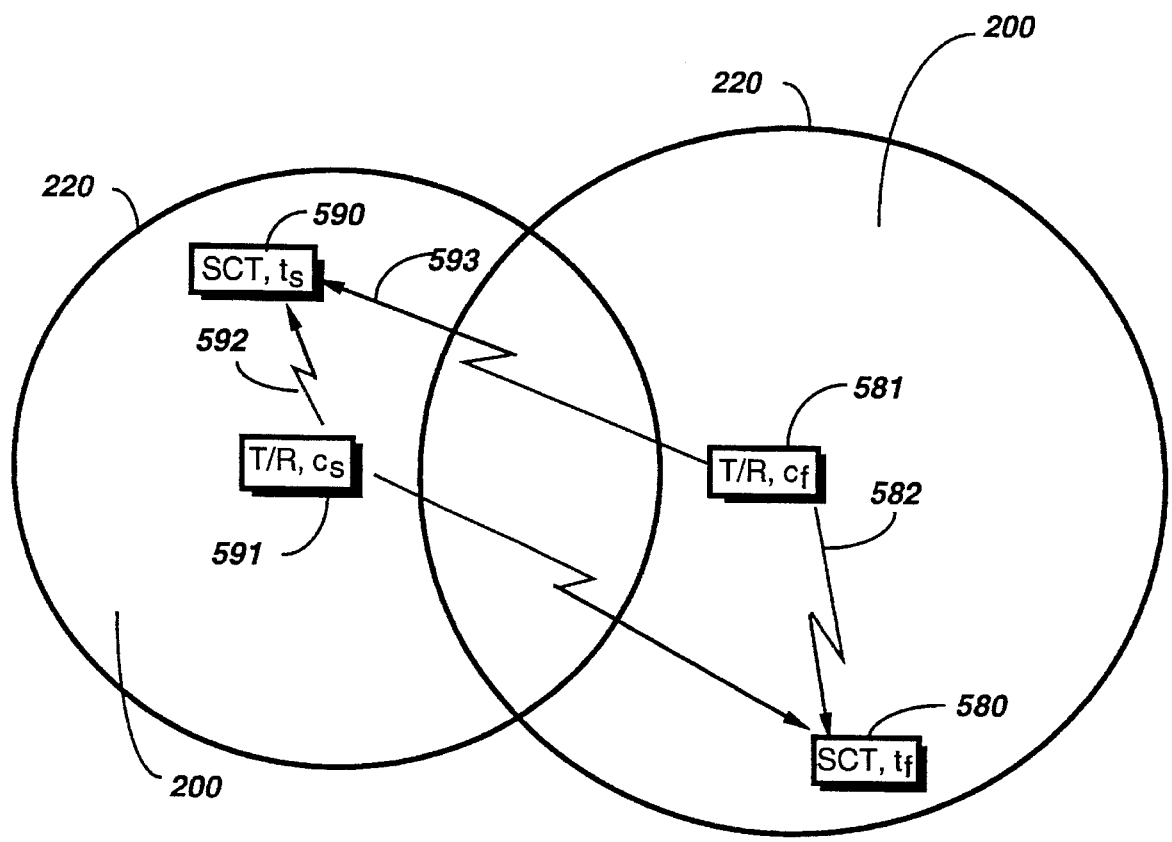
FIG. 6 shows a pictorial diagram depicting two selective call transceivers which are being scheduled to receive messages, in accordance with the preferred embodiment of the present invention.

Referring to FIG. 6, a pictorial diagram depicts a first selective call transceiver 580 and a second selective call transceiver 590 which are being scheduled to receive messages, in accordance with the preferred embodiment of the present invention. A first selective call transceiver 580, $t_f$, is scheduled to receive a first message from a first cell transmitter 581, $c_f$, via outbound path 582, and a second selective call transceiver 590, $t_s$, is scheduled to receive a second message from a second cell transmitter 591, $c_s$, via outbound path 592. When a first outbound signal including the first message and a second outbound signal including the second message are transmitted at the same time, the first outbound signal will interfere with the second outbound signal when the signal strength of the first outbound signal is sufficiently strong with respect to the signal strength of the second outbound signal at the second selective call transceiver 590, $t_s$. The path loss means 440 determines an outbound path loss, $OP(c_s, t_s)$, of the outbound path 592 by subtracting the average minimum strength of the outbound signal strength, $X_n(c_s,t_s)$, from the best power level, $Y(c_s,t_s)$, of the cell transmitter 591. This results in a conservative maximum estimate of the path loss, $OP(c_s, t_s)$, for the intended path of the second outbound signal to the second selective call transceiver 590. A signal strength, $P(c_s, t_s)$, of the second outbound signal at the second selective call transceiver 590, $t_s$, is then determined from the outbound path loss, $OP(c_s, t_s)$ of the outbound path 592, and the best power level, $Y(c_s, t_s)$, of the cell transmitter, $c_s$, being scheduled to transmit the second message. This results in a conservative minimum estimate of the signal strength, $P(c_s, t_s)$, of the intended signal. The path loss means 440 determines an outbound path loss, $OP(c_f, t_s)$, of an outbound path 593 by subtracting the average maximum strength of the outbound signal power, $X_m(c_f, t_s)$, from the best power level, $Y(c_f, t_f)$, of the cell transmitter 581. This results in a conservative minimum estimate of the path loss, $OP(c_f, t_s)$, for the interfering path of the first outbound signal to the second selective call transceiver 590. A signal strength, $P(c_f, t_s)$, of the first outbound signal at the second selective call transceiver 590, $t_s$, is determined from an outbound path loss, $OP(c_f, t_s)$ of the outbound path 593, and the best power level, $Y(c_f, t_f)$, of the cell transmitter, $c_f$, which is being scheduled to transmit the first message. This results in a conservative maximum estimate of the signal strength, $P(c_f, t_s)$, of the interfering signal.

Referring back to FIG. 5, the interference tester 525 comprises a test output 526 which is positive when the first message is calculated to cause interference with the second message. The interference tester 525 further comprises a calculator 527 which is coupled to the path loss means 440 and which determines whether the ratio of the signal strength of a first outbound signal which includes the first message to the signal strength of a second outbound signal which includes the second message exceeds the predetermined $S/I(t_s)$ of the selective call transceiver 106, $t_s$, associated with the second message. The calculator determines the signal strengths $P(c_s, t_s)$, and $P(c_f, t_s)$ as described above with reference to FIG. 6. The first message is determined to cause interference with the second message when the first message is simultaneous with the second message and the difference $P(c_f, t_s)-P(c_s, t_s)$ is greater than $S/I(t_s)$. The terms $P(c_f, t_s)$, $P(c_s, t_s)$, and $S/I(t_s)$ are preferably calculated in dBmW, so the difference of $P(c_f, t_s)$ and $P(c_s, t_s)$ expresses their ratio in dB. The path losses $OP(c_f, t_s)$ and $OP(c_s, t_s)$ are calculated by the calculator 527 from the set of signal strengths which are stored in the signal strength collection means 432. The first message is simultaneous with the second message when any portion of the first message is simultaneous with the second message, or to state this another way, when the second message has a transmission time starting before the end of the first message. In summary, the calculator 527 is coupled to the path loss means 440 and the signal strength means 432 for determining that the first message interferes with the second message when the first message is simultaneous with the second message and $Y(c_f, t_s)-OP(c_f, t_s)-[Y(c_s, t_s)-OP(c_s, t_s)]>S/I(t_s)$. It will be appreciated that the best power level at a best cell transmitter is not necessarily the same power level used to generate the outbound signal which is measured previously by a selective call transceiver 106 to determine a signal strength (and thereby also determine the path loss). Therefore, calculating the signal levels after the best power levels are determined improves the estimation of interference over that which would occur when using the signal strengths measured by the selective call transceiver.

The maximal interfering message remover 530 is coupled to the non-scheduled memory 550 and the interference tester 525, and identifies a plurality of message pairs for testing by the interference tester 525. When the test output 526 is positive, the maximal interfering message remover 530 increments one of a plurality of interference counts. The plurality of interference counts comprises an interference count associated with each message. When the plurality of message pairs have been tested by the interference tester 525, the maximal interfering message remover 530 identifies the maximum of the plurality of interference counts, and then identifies a message associated the maximum interference count as a maximally interfering message. The maximal interfering message remover then removes the maximally interfering message from the scheduled memory to the non-scheduled memory.

The maximal interfering message remover 530 comprises a message pair selector 531 which is coupled to the scheduled memory 414 and the interference tester 525, and which is for selecting the plurality of message pairs to consist of all permutations of message pairs wherein a best cell transmitter associated with the first message is adjacent to a best cell transmitter associated with the second message, and wherein the first message is scheduled for transmission simultaneously with the second message. The meaning of the term "simultaneously" is the same as described above. For each cell transmitter in the plurality of transmitter/receivers 103, a set of adjacent cell transmitters is identified. Interference from a signal transmitted at $P_{max}(c_i)$ from a cell transmitter $(c_i)$ is possible at selective call transceivers 106 identified as best cell transmitters for other messages which are adjacent to cell transmitter $(c_i)$, but is not likely at selective call transceivers 106 identified as best cell transmitters for other messages not adjacent to cell transmitter $(c_i)$. The scheduler 520 repeats the process until all messages having any interference count are removed from the scheduled memory 414. Removing the messages in this order optimizes the number of interfering messages remaining after all messages having any interference count are removed. When a maximally interfering message is removed, only the interference counts of messages with which the maximally interfering message interfered are recalculated to determine the next maximally interfering message. Continuing the example shown in Tables 1–4, the contents of the scheduled memory 414 are shown in Table 5.

TABLE 5

| Message Number | Selective Call Transcvr $t_j$ | Duration (slots) | Best Cell Transmitter $c_i$ | Best Power Level $Y(c_i, t_j)$ (dBmW) | Transmission Time (slot #) | Interference Count |
| --- | --- | --- | --- | --- | --- | --- |
| 15 | 34 | 4 | 1 | 37 | 0 | 4 |
| 4 | 34 | 15 | 1 | 57 | 4 | 4 |
| 19 | 12 | 2 | 2 | 22 | 0 | 1 |
| 13 | 23 | 6 | 2 | 22 | 2 | 2 |
| 2 | 12 | 8 | 2 | 27 | 8 | 0 |
| 3 | 23 | 3 | 3 | −3 | 0 | 0 |
| 1 | 12 | 4 | 3 | 27 | 3 | 2 |
| 5 | 12 | 12 | 3 | 42 | 7 | 2 |

Referring to FIG. 7 and FIG. 8, timing diagrams of the messages being scheduled for transmission from the plurality of cell transmitters of the radio communication system 100 are shown, in accordance with the preferred embodiment of the present invention. The message number 650, the best cell power 660, and the number of interferences 670 affecting other messages are shown in FIG. 7 and FIG. 8 within each message time frame in a common format. FIG. 7 shows the transmission times and duration of messages listed in Table 5 by reference to the time slots 610. In this example, all path losses are equivalent, cell transmitters 1, 2, and 3 are all adjacent, and interference occurs when the ratio is greater than −10 dB. Three cell subsets 620, 630, 640 are shown in FIG. 7. The maximal interfering message remover 530 will first remove message from cell subset 1 in the scheduled memory 414 and put message 4 into the non-scheduled memory 550. The maximal interfering message remover 530 will continue to remove, one at a time, a message having the maximum interference count of the remaining messages, until all interfering messages are removed. In this example, when all interfering messages are removed, the contents of the scheduled memory are as shown in FIG. 8. Only the two cell subsets 720, 730 have messages remaining in the scheduled memory 414.

Referring again to FIG. 5, the message advancer 535 is coupled to the interference tester 525 and the scheduled memory 414. The message advancer 535 is for advancing a transmission time, which is at a first time, of a later message to a second time (which is earlier than the first time). The later message is in a first cell subset. After the transmission time of the later message is advanced, no portion of the later message is simultaneous with other messages in the first cell subset. The message advancer 535 selects a set of message pairs, each of which is tested by the interference tester 525. Each of the set of message pairs includes the later message as the first message. The message advancer retards the transmission time of the later message to the first time when interference tester 525 has a positive output. Referring to FIG. 9, a timing diagram of the messages being scheduled for transmission from the plurality of cell transmitters of the radio communication system 100 is shown, in accordance with the preferred embodiment of the present invention. T-he format used in the messages in FIG. 9 identifying the message number, the best cell power, and the number of interferences is the same as used in FIG. 7 and FIG. 8. The transmission times and durations of messages listed in Table 5 are shown in FIG. 9 by reference to the time slots 610. The scheduled transmission times and durations illustrated in FIG. 9 are those defined after the message advancer 535 has advanced the transmission time of message 2. The transmission time of message 2 is subsequently retarded by the message advancer 535 because of the 2 interferences counted for message 2. Referring to FIGS. 10 and 11, timing diagrams of the messages being scheduled for transmission from the plurality of cell transmitters of the radio communication system 100 are shown, in accordance with the preferred embodiment of the present invention. The format used in the messages in FIG. 10 and FIG. 11 identifying the message number, the best cell power, and the number of interferences is the same as used in FIG. 7 and FIG. 8. The transmission times and durations of messages shown in FIGS. 10 and 11 are with reference to the time slots 610. This is a new example, in which the characteristics are different than earlier examples. In this example, all path losses are not necessarily equivalent, and cell transmitters 1, 2, and 3 are not necessarily all adjacent. Interference occurs when the ratio is greater than −10 dB. The messages shown differ from those in Tables 1–5.

Referring to FIGS. 5, 10, and 11, the non-scheduled message optimizer 540 is coupled to the non-scheduled memory 550 and the scheduled memory 414, and selects a target cell subset 920. The non-scheduled message optimizer 540 identifies a message completion time 930 of a last message 940 in the target cell subset 920 and moves a best non-scheduled message from the non-scheduled memory 550 to the target cell subset 920 in the scheduled memory 414. The best non-scheduled message and the target cell subset 920 are associated with a common best cell transmitter. The non-scheduled message optimizer 540 generates a new last message 1020 by scheduling a transmission time of the best non-scheduled message to be consecutive to the message completion time of the last message in the target cell subset 920.

The non-scheduled message optimizer 540 comprises a non-scheduled message selector 541 for calculating a set of total durations. Each total duration in the set of total durations is a sum of the duration of each message in a cell subset which has a best cell transmitter in common with a best cell transmitter of any non-scheduled message. The non-scheduled message selector 541 identifies a cell subset which has a minimum total duration of the set of total durations, as the target cell subset 920. The non-scheduled message selector 541 selects a non-scheduled message which has an associated best cell transmitter which is common with the best cell transmitter of the target cell subset as the best non-scheduled message.

The non-scheduled message optimizer 540 further comprises a power selector 542 which selects, as the best non-scheduled message, a non-scheduled message having a best power level which is a minimum power level associated with non-scheduled messages which are associated with the target cell subset.

The non-scheduled message optimizer 540 further comprises an optimizer tester 543 for testing an optimized set of message pairs, each of which is tested by the interference tester 525. Each of the optimized set of message pairs includes the new last message 1020 as the first message. The optimizer tester 543 is for moving the new last message from the target cell subset to the non-scheduled memory 550 when the test output 526 is positive, that is, when the new last message interferes with another message.

Figure 13:
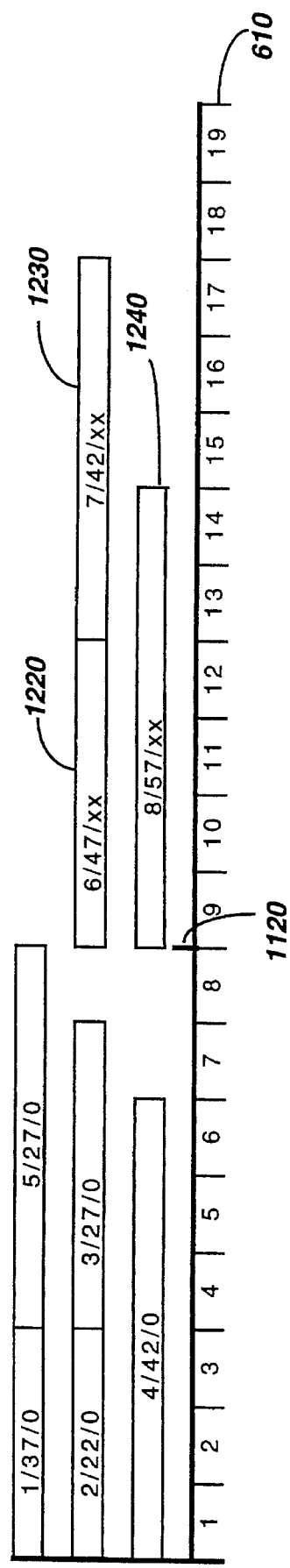

Referring to FIGS. 12 and 13, timing diagrams of the messages being scheduled for transmission from the plurality of cell transmitters of the radio communication system 100 are shown, in accordance with the preferred embodiment of the present invention. The format used in the messages in FIG. 12 and FIG. 13 identifying the message number, the best cell power, and the number of interferences is the same format as used in FIG. 7 and FIG. 8. The transmission times and durations of messages shown in FIGS. 12 and 13 are with reference to the time slots 610. In this example, all path losses are not necessarily equivalent, and cell transmitters 1, 2, and 3 are not necessarily all adjacent. Interference occurs when the ratio is greater than −10 dB. The messages shown are the same as those in FIG. 10 and FIG. 11.

The scheduler 520 further comprises a post completion scheduler 545 which is coupled to the scheduled memory 414 and the non-scheduled memory 550. The post completion scheduler 545 determines a last non-interfering message completion time 1120, and moves a non-scheduled message from the non-scheduled memory 550 to a cell subset in the scheduled memory 414 which has a cell transmitter in common with the non-scheduled message. The last non-interfering message completion time 1120 is the latest completion time of the completion times of all messages in the scheduled memory 414, when no messages in the scheduled memory 414 have any interference count, and no more messages are able to be added to the scheduled memory 414 from the non-scheduled memory 550 by the message advancer 535 and the non-scheduled message optimizer 540. The post completion scheduler 545 schedules a transmission time of the non-scheduled message after the last non-interfering message completion time. More specifically, the scheduler 520 selects non-scheduled messages from the non-scheduled memory 550 which have a cell subset in common and puts them into the scheduled memory having transmission times scheduled such that the non-scheduled messages in each common cell subset are scheduled for consecutive transmission beginning at the last non-interfering message completion time, in order from the lowest power to the highest power.

In this example, messages 1220, 1230, and 1240 have been scheduled by the post completion scheduler 545. The x's in the messages in FIG. 13 indicate that interference counting is not used by the post completion scheduler. The result of the post completion scheduling is to transmit the remaining unscheduled messages irrespective of interference calculations. Because the interference calculations are typically conservative, and because the transmitted radio signals are subject to time varying environmental conditions, the messages transmitted prior to the last non-interfering message completion time will have a high probability of successful receipt by the intended selective call transceivers 106, while the messages transmitted subsequent to the last non-interfering message completion time have a lower, but non-negligible, probability of successful receipt by the intended selective call transceivers 106.

It will be appreciated that the use of any one of the message advancer 535, the non-scheduled message optimizer 540, and the post completion scheduler 545 provides improved scheduling without the use of the others, but that the use of any two will, in general, provide improved scheduling of the set of messages over the use of only one, and that the use of all three generally provides the best improvement of the scheduling of the set of messages.

System controller 102 is preferably a model MPS2000® paging terminal manufactured by Motorola, Inc., of Schaumburg Ill. modified with special firmware elements in accordance with the preferred embodiment of the present invention, as described herein. The cell site controller 402, the message handler 404, the queue memory 408, the subscriber data base 420, the encoder 450, the telephone interface 406, the message selection means 412, the scheduled memory 414, the scheduling means 416, and the best cell means 430 are preferably implemented within portions of the model MPS2000® paging terminal which include, but are not limited to those portions providing program memory, a central processing unit, input/output peripherals, and a random access memory. The system controller alternatively could be implemented using a model E09PED0552 PageBridge® paging terminal manufactured by Motorola, Incorporated of Schaumburg, Ill. The subscriber data base 420, queue memory 408, the scheduled memory 414, and portions of the signal strength collection means 432 and the path loss means 440 may alternatively be implemented as magnetic or optical disk memory, which may alternatively be external to the system controller 102.

Figure 14:
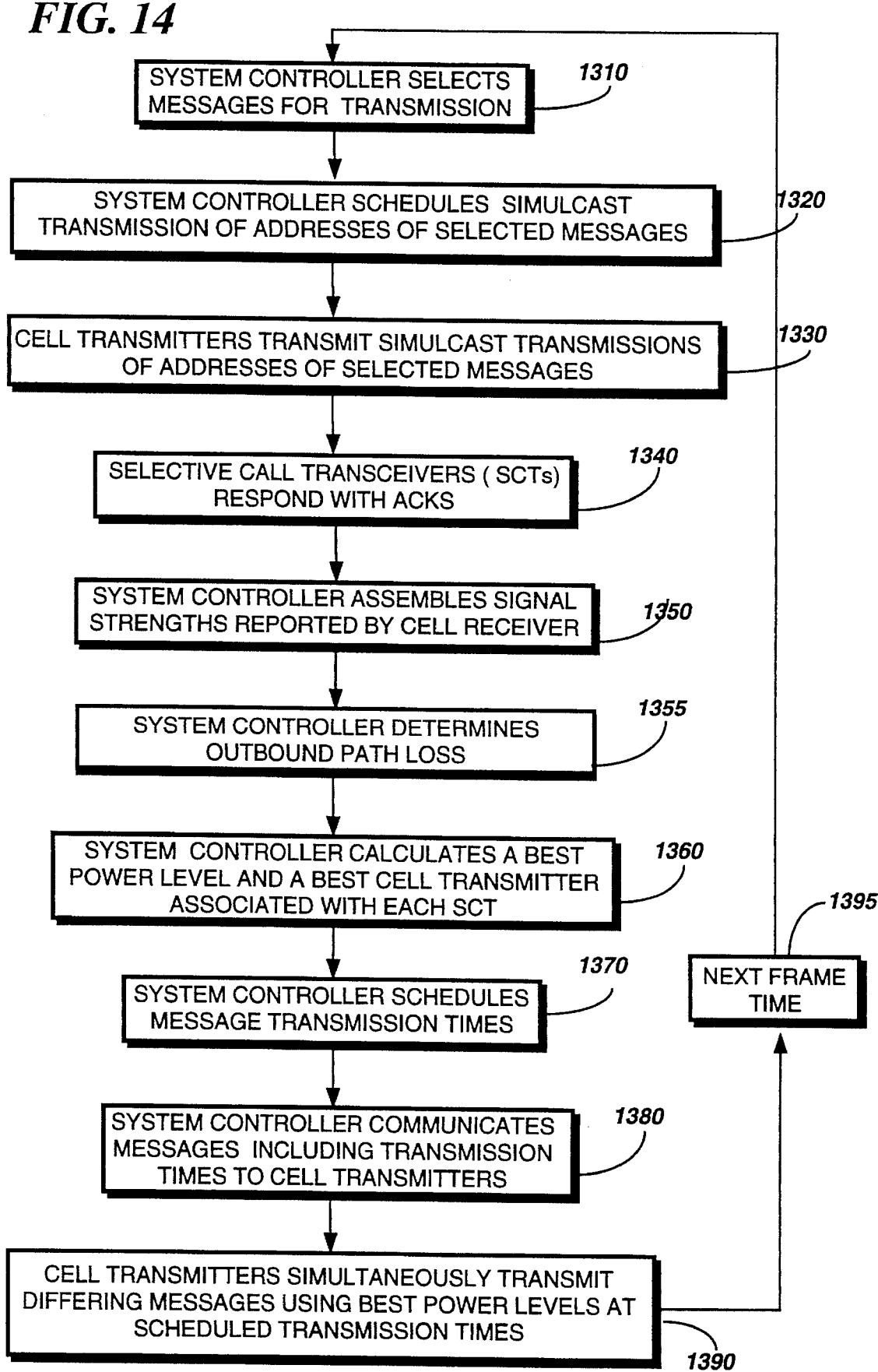
FIG. 14 shows an overall flow chart of a method for scheduling transmission times of outbound signal transmissions in the radio communication system, in accordance with the preferred embodiment of the present invention.

Referring to FIG. 14, an overall flow chart of a method for scheduling transmission times of outbound signal transmissions in the radio communication system 100 is shown, in accordance with the preferred embodiment of the present invention. At step 1310, the system controller 102 selects a set of messages from a queue of messages which are queued for delivery to at least one of the plurality of selective call transceivers (SCTs) 106. Each message in the queue of messages is associated with one of the plurality of selective call transceivers 106 and has a duration. At step 1320, the controller schedules a simulcast broadcast which includes addresses of selective call transceivers for which messages are included in the set of messages and for which a signal strength indication has not been received within some predetermined time frame. The simulcast transmission is transmitted at step 1330 by the plurality of cell transmitters. At step 1340, the selective call transceivers 106 receive the simulcast transmission. The selective call transceivers 106 transmit inbound acknowledgment signals which are received by the plurality of cell receivers. Signal strengths are determined from the inbound acknowledgment signals and are reported by the cell receivers to the system controller 102, which assembles the signal strengths at step 1350. The system controller 102 determines outbound path losses for each cell transmitter/selective call transceiver path at step 1355 wherein the outbound path losses are determined from the set of signal strengths and other predetermined values.

At step 1360, the system controller 102 calculates a best power level and a best cell transmitter associated with each message in the set of messages. The determination is made from the signal strengths reported by the cell receivers at step 1350 both from present and prior instances of execution of the step. The best power level is determined for use at the best cell transmitter to reliably transmit each message to one of the plurality of selective call transceivers at a minimum required power level. At step 1370, the system controller schedules the transmission times of the set of messages. At step 1380, the system controller then controls transmission of the outbound signals comprising the set of messages from the plurality of cell transmitters according to the transmission times scheduled in step 1370. The outbound radio signals which include the messages are transmitted by the cell transmitters at step 1390. Messages newly received at the system controller 102 via the STN 108 or from other selective call transceiver 106 which are intended for selective call transceivers 106 are queued up for a predetermined frame time at step 1395. The predetermined time frame includes enough time for the system controller 102 to perform steps 1310 to 1390 of the method. When the time frame is complete the system controller selects a new set of messages from the queue and the method is repeated starting at step 1320.

Figure 15:
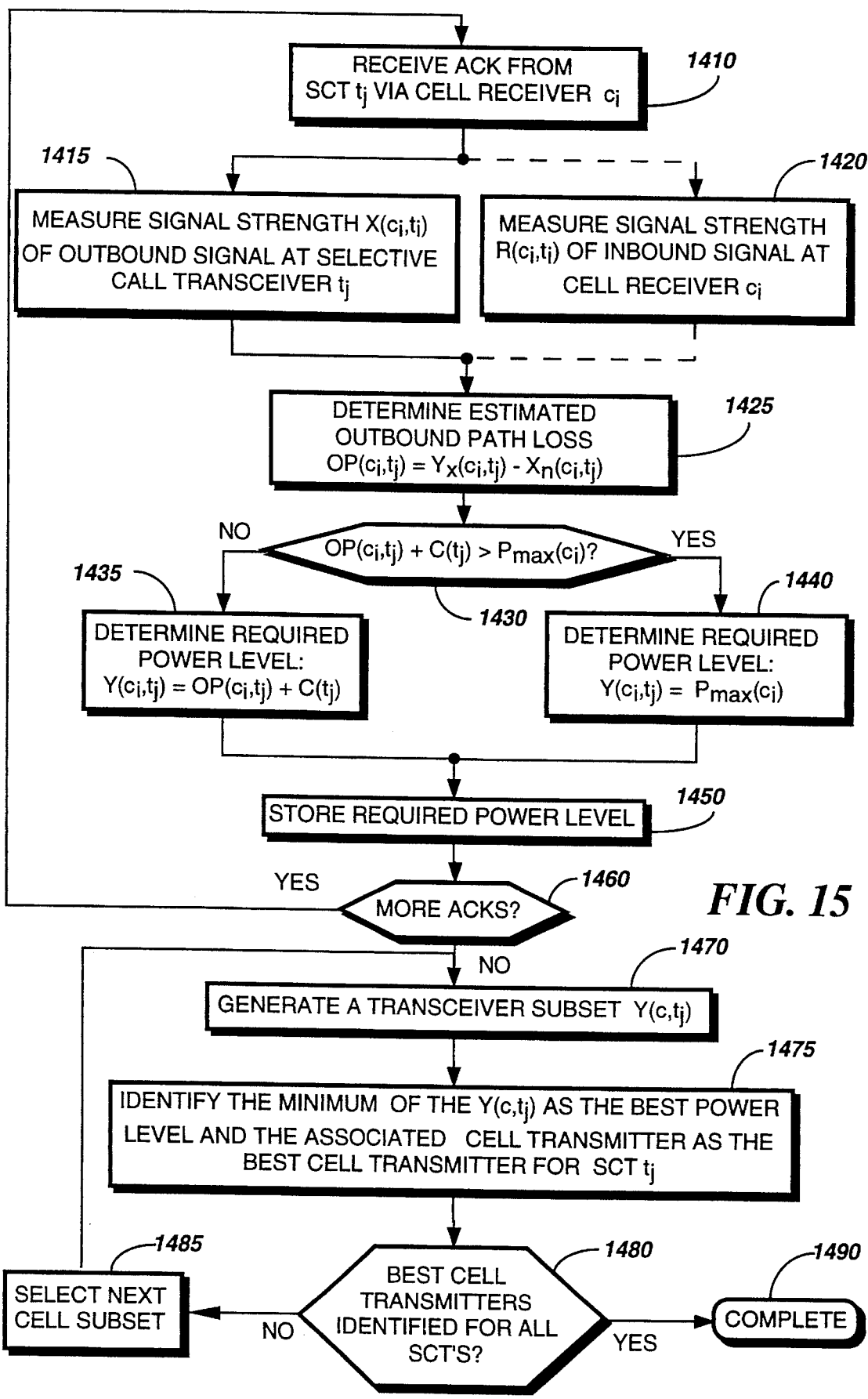
FIG. 15 shows a flow chart of a method for determining a best power level and a best cell transmitter associated with each message, in accordance with the preferred embodiment of the present invention.

Referring to FIG. 15, a flow chart of a method for determining a best power level and a best cell transmitter associated with each message is shown, in accordance with the preferred embodiment of the present invention. The method for determining a best power level and a best cell transmitter associated with each message is used in the system controller 102 at steps 1350, 1355, and 1360 in the method for scheduling transmission times of outbound signal transmissions in the radio communication system 100. An acknowledgment (ACK) is received in an inbound signal from a selective call transceiver, $t_j$, via a cell receiver, $c_i$, at step 1410. A signal strength, $X(c_i,t_j)$, which includes a maximum, $X_m(c_i,t_j)$, and a minimum, $X_n(c_i,t_j)$, average signal strength of the outbound signal received and measured at one of the plurality of the selective call transceivers 106, is reported by the selective call transceiver 106, communicated to the system controller 102, and is recovered by the system controller at step 1415. An estimated path loss for the outbound path is determined, at step 1425, by subtracting the recovered average minimum signal strength, $X_n(c_i,t_j)$, from the power level, $Y_x(c_i,t_j)$, used to transmit the outbound signal to which the selective call transceiver 106 is responding with the ACK. The estimated path loss is designated $OP(c_i,t_j)$. As described above, $C(t_j)$ is a predetermined receiving sensitivity associated with $t_j$, and $P_{max}(c_i)$ is a predetermined maximum transmit power of a cell transmitter, $c_i$. When $OP(c_i,t_j)+C(t_j)<=P_{max}(c_i)$ at step 1430, a required power level, $Y(c_i,t_j)$, for the path $(c_i,t_j)$ is determined, at step 1435, as $Y(c_i,t_j)=OP(c_i,t_j)+C(t_j)$. When $OP(c_i,t_j)+C(t_j)>P_{max}(c_i)$ at step 1430, the required power level, $Y(c_i,t_j)$, for the path $(c_i,t_j)$ is determined, at step 1440, as $Y(c_i,t_j)=P_{max}(c_i)$. The required power level is stored at step 1450. When a determination is made that more received ACKs need processing at step 1460, processing of a new ACK starts at step 1410.

In an alternative embodiment of the present invention, a signal strength, $R(c_i,t_j)$, which is an average signal strength of the inbound signal generated by the selective call transceiver 106 which includes the ACK, is measured by one of the plurality of cell receivers, reported by the cell receiver to the system controller 102, and recovered by the system controller at step 1420. An estimated path loss for the outbound path, $OP(c_i,t_j)$, is determined, at step 1425 from the recovered average signal strength and the power level used to transmit the inbound signal from the selective call transceiver, in a manner in a manner described above with respect to the operation of the best cell means 430.

When a determination is made that no more received ACKs need processing at step 1460, the method continues at step 1470 by generating a transceiver subset of required power levels, wherein the transceiver subset comprises required power levels, $Y(c,t_j)$, for a plurality of cell paths between a transmitter and a selective call transceiver associated with a selective call transceiver, $t_j$. When there is only one cell transmitter/selective call transceiver path associated with a selective call transceiver, $t_j$ the transceiver subset comprises the one required power level, $Y(c,t_j)$ associated with the selective call transceiver, $t_j$. At step 1475, a minimum of the required power levels of the transceiver subset is determined and the one of the plurality of cell transmitters associated with the minimum of the required power levels is identified as the best cell transmitter having the best power level for the selective call transceiver 106. When a best cell transmitter and best power level have not been determined for all selective call transceivers 106 for which there is a message in the set of messages being scheduled, a next cell subset is determined at step 1485 and the method continues with the generation of a new transceiver subset at step 1470. When a best cell transmitter and best power level has been determined for all selective call transceivers 106 for which there is a message in the set of messages being scheduled, the method for determining a best power level and a best cell transmitter associated with each message is complete, at step 1490.

Figure 16:
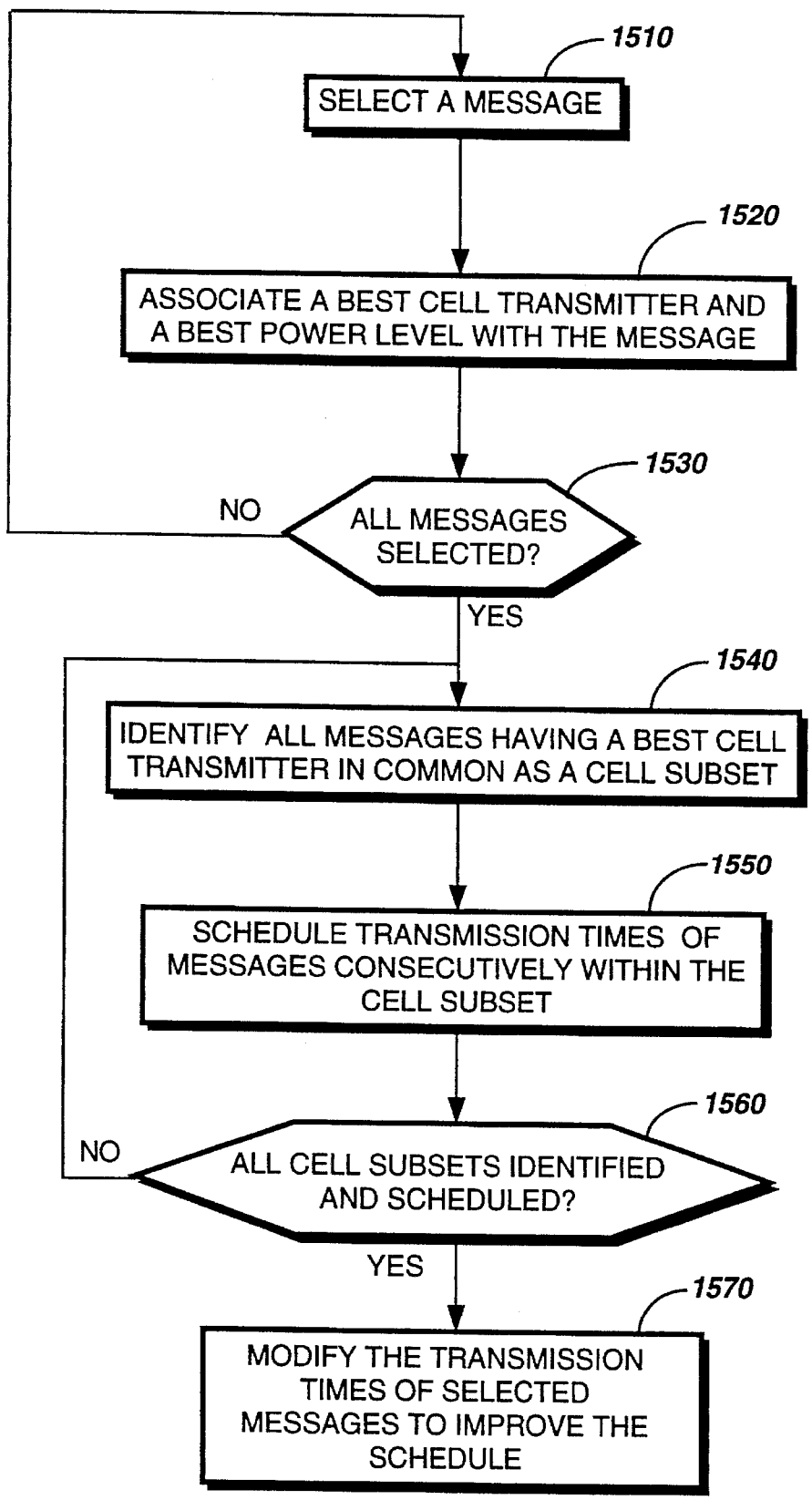
FIG. 16 shows a flow chart of a method for scheduling transmission times, in accordance with the preferred embodiment of the present invention.
Figure 17:
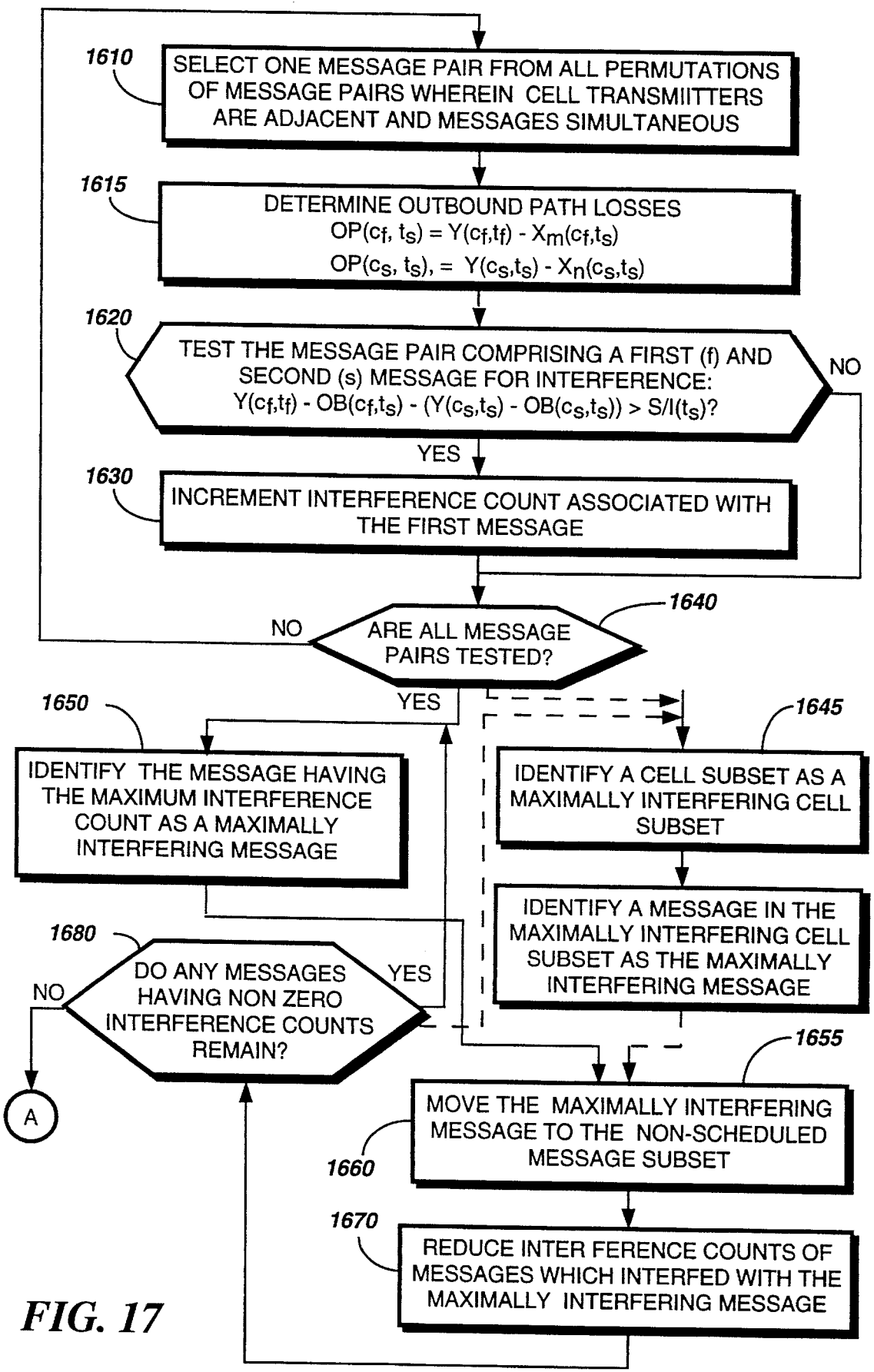
FIGS. 17, 18, 19, and 20 show a flow chart of a method for modifying the transmission times of messages in the initial schedule, in accordance with the preferred embodiment of the present invention.

Referring to FIG. 16, a flow chart of a method for scheduling transmission times is shown, in accordance with the preferred embodiment of the present invention. The method for scheduling transmission times is used in the system controller 102 at step 1370 in the method for scheduling transmission times of messages included in outbound signals in the radio communication system 100. At step 1510, a message in the set of messages is selected and, at step 1520, a best cell transmitter and best power level is associated with the selected message based on a selective call transceiver associated with both the selected message and with the best cell transmitter. For example, message number 34 is selected. Message number 34 is addressed to selective call transceiver number 15. Selective call transceiver number 15 is associated with a best cell transmitter number 87, which has a best power level of 35 dBmW. Thus, message number 34 is associated with the best cell transmitter number 87, along with the best power level of 35 dBmW at step 1520. When a determination is made at step 1530 that all messages in the set of messages have not been associated with a best cell transmitter and best power level, a new message is selected at step 1510 and steps 1510–1520 are repeated.

When a determination is made at step 1530 that all messages in the set of messages have been associated with a best cell transmitter and best power level, a subset comprising one or more messages having a best cell transmitter in common is identified as a cell subset of the set of messages, at step 1540. A transmission time of each of the one or more messages in the cell subset is scheduled consecutively within the cell subset, firstly in order of increasing value of the best power level, and secondly in order of increasing duration of each message at step 1550. When a determination is made that all cell subsets have not been identified (i.e., not all messages in the set of messages have been identified as a member of a cell subset) at step 1560, a new cell subset is identified at step 1540, and steps 1540–1550 are repeated. The method for scheduling transmission times is completed by modifying, at step 1570, the transmission times of messages which have been scheduled when all cell subsets have been identified at step 1560. The number of messages which are modified can be from none to all messages, as determined by the method which is detailed below. In summary, the method for scheduling transmission times comprises two major parts: a method for generating an initial schedule comprising a plurality of cell subsets of the set of messages (steps 1510 to 1560), and modifying the transmission times of messages in the initial schedule (step 1570).

Referring to FIGS. 17, 18, 19, and 20, a flow chart of a method for modifying the transmission times of messages in the initial schedule is shown, in accordance with the preferred embodiment of the present invention. The method for modifying transmission times is used in the system controller 102 at step 1570 in the method for scheduling transmission times of messages. At step 1610 (FIG. 17), a message pair comprising a first message and a second message is selected from a plurality of message pairs. The plurality of message pairs consists of all permutations of message pairs in the set of messages, wherein a best cell transmitter associated with a first message is adjacent to a best cell transmitter associated with a second message, and wherein the first message is scheduled for transmission simultaneously with the second message. Adjacent cell transmitters are predetermined for each transmitter, as a means to eliminate unnecessary determinations by the system controller 102. Non-adjacent transmitters are selected such that transmissions from the non-adjacent transmitters have a very low probability of interfering with each other. It will be appreciated that because the definition used herein for adjacent cell transmitters is based on probabilities of receiving a radio signal, all non-adjacent transmitters are not necessarily farther from a particular cell transmitter than all adjacent cell transmitters, as might be the case for a purely geographical definition. At step 1615, outbound path losses $OP(c_s,t_s)$ and $OP(c_i, t_s)$ are determined, respectively, for the intended signal which includes the second message and the interfering signal which includes the first message. As described above with reference to FIGS. 5 and 6, $OP(c_f, t_s)=Y(c_f,t_f)-X_m(c_f,t_s)$, and $OP(c_s, t_s)=Y(c_s,t_s)-X_n(c_s,t_s)$. The message pair is tested at step 1620 and a determination is made that the first message interferes with the second message when the first message is simultaneous with the second message, and $Y(c_f,t_f)-OP(c_f,t_s)-(Y(c_s, t_s)-OP(c_s,t_s))>S/I(t_s)$. $S/I(t_s)$ represents the predetermined selective call transceiver signal to interference ratio for a selective call-transceiver of the second message. When a determination is made that interference occurs, the result of the test is positive, and one of a plurality of interference counts which is associated with the message selected as the first message in the test is incremented at step 1630. Thus, an interference count is maintained for each message in the set of messages. When not all message pairs are determined to have been tested at step 1640, a new message pair is selected at 1610 and the testing and incrementing are repeated at steps 1620 and 1630.

When all message pairs are determined to have been tested at step 1640, a message in the set of messages associated with the maximum of the plurality of interference counts is identified as a maximally interfering message, and the cell subset associated with the maximally interfering message is identified as a maximally interfering subset, at step 1650. The maximally interfering message is moved from the maximally interfering cell subset in the set of messages to a non-scheduled subset of messages at step 1660. At step 1670, the interference count for messages which are associated with best cell transmitters adjacent to the best cell transmitter of the maximally interfering subset and which are simultaneous with the maximally interfering message are reduced as determined by the result of the interference test conducted which involved the maximally interfering message as the second message. For example, message number 12 is determined to be the maximally interfering message. Message 12 is associated with best cell transmitter 36. Best cell transmitter 36 is adjacent to cell transmitters 4 and 7. Messages 45 and 56 are in the cell subset of cell transmitter 4 and simultaneous with message 12. Messages 44 and 47 are in the cell subset of cell transmitter 7 and simultaneous with message 12. The interference count for each of the messages 45, 56, 44, and 47 is therefore reduced when each of them is tested with message 12 as the second message in the message pair and the result is positive. When any message having a non-zero interference count is determined to remain in the plurality of cell subsets at step 1680, the next maximally interfering message is identified at Step 1650, and steps 1650–1670 are repeated. When no message having a non-zero interference count is determined to remain in the plurality of cell subsets at step 1680, a process of removing all interfering messages from the plurality of cell subsets has been completed, improving the probable delivery of the messages remaining in the cell subsets.

In an alternative embodiment of the present invention, a cell subset having a maximum sum of interference counts associated with the messages in the cell subset is identified as a maximally interfering cell subset at step 1645, and a message associated with a maximum interference count in the maximally interfering cell subset is identified as a maximally interfering message at step 1655.

Figure 18:
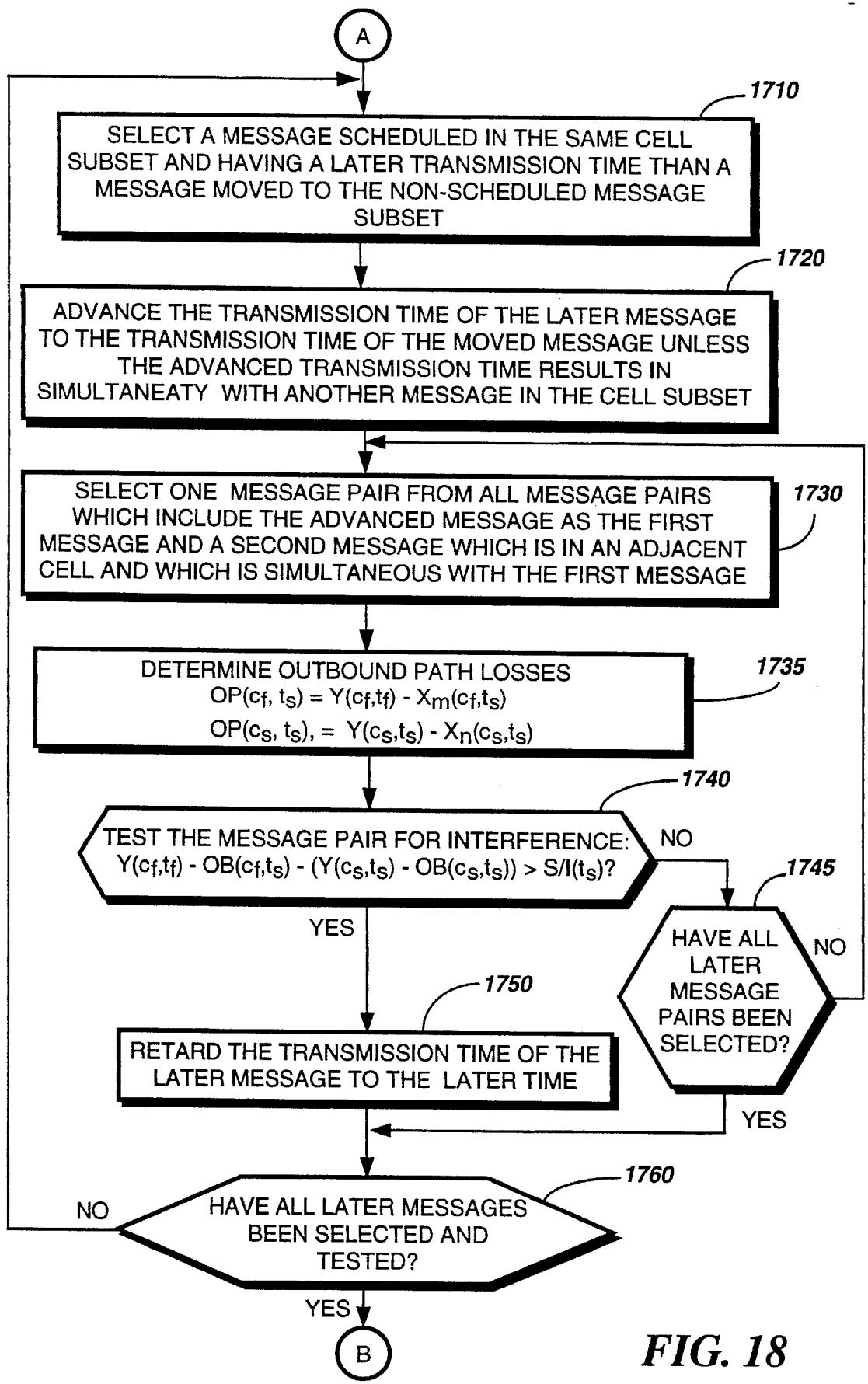

When no message having a non-zero interference count is determined to remain in the plurality of cell subsets at step 1680, a later message is selected at step 1710 (FIG. 18). A later message is a message having a later transmission time than a message which is in the non-scheduled message subset. The transmission time of the later message, which has a first transmission time is advanced to a second transmission time which is an earlier time at step 1720. No portion of the later message, which is in a first cell subset, is simultaneous with other messages in the first cell subset after the transmission time of the later message is advanced. The later message is identified as the first message for testing a message pair and a second message is selected from all messages wherein the best cell transmitter associated with the first message is adjacent to the best cell transmitter associated with the second message, and wherein the first message is scheduled for transmission simultaneously with the second message at step 1730. Outbound path losses $OP(c_s,t_s)$ and $OP(c_f, t_s)$ are determined at step 1735, respectively, for the intended signal which includes the second message and the interfering signal which includes the first message, using the same formulas used at step 1615. The message pair selected at step 1730 is tested at step 1740, using the same determination criteria used at step 1620. When the result is positive at step 1740, the transmission time of the later message is retarded to the first time at step 1750. When the result is not positive at step 1740 and when all unique message pairs described above which include the later message as the first message have not been selected at step 1745, steps 1710 to 17.40 are repeated. When the result is not positive at step 1740 and when all unique message pairs described above which include the later message as the first message have been selected at step 1745, a determination is made at step 1760 as to whether all later messages have been selected. When a determination is made at step 1760 that all later messages have not been selected, a later message is selected at step 1710 and the method tests the later message as described above. When a determination is made at step 1760 that all later messages have been selected, a process of advancing the transmission times of later messages is completed, while maintaining noninterference between the messages remaining in the cell subsets, thereby potentially improving the speed of delivery of the non-interfering messages in the cell subsets.

Figure 19:
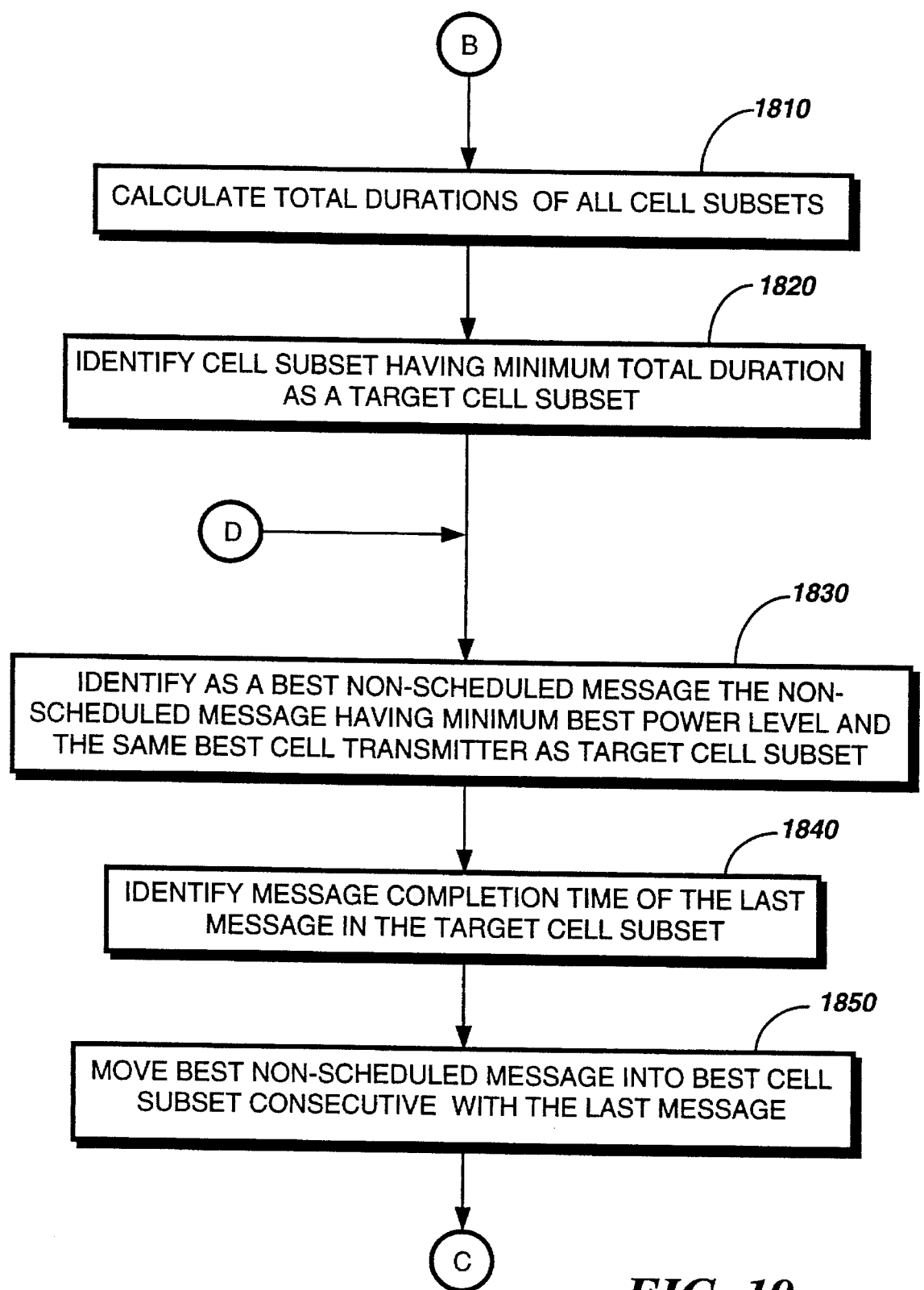
Figure 20:
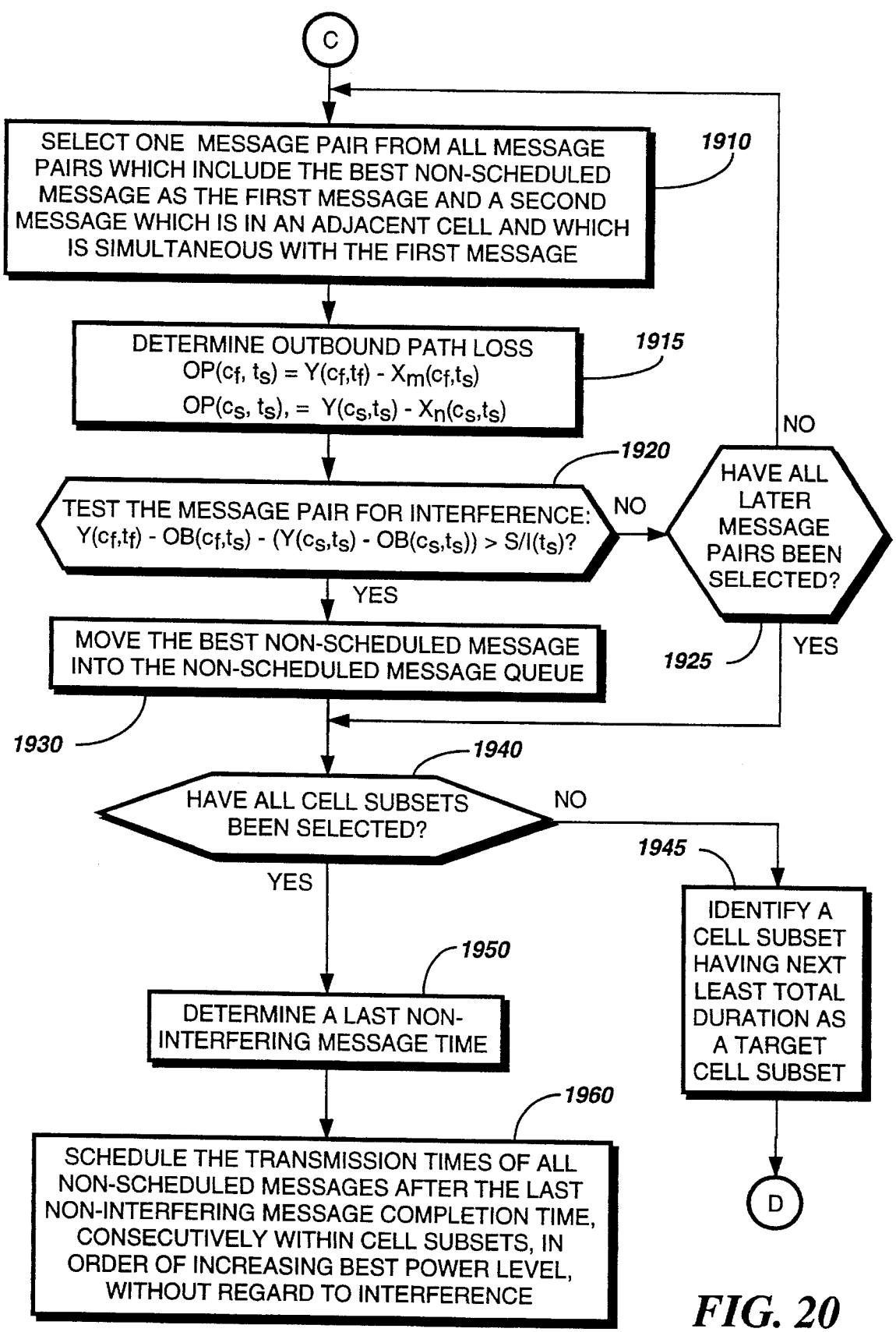

When the determination is made at step 1760 that all later messages have been selected, a total duration is calculated for each of the cell subsets, resulting in a set of total durations, at step 1810 (FIG. 19). Each total duration is a sum of the duration of each message in a cell subset which has a best cell transmitter in common with a best cell transmitter of any non-scheduled message. A cell subset is identified as a target cell subset at step 1820. The target cell subset has a minimum total duration of the set of total durations. A non-scheduled message having a best power level which is a minimum power level associated with non-scheduled messages which are associated with the target cell subset is selected as a best non-scheduled message at step 1830. For example, the target cell subset is a subset associated with best cell transmitter 45. Nonscheduled message 76, 84, and 3, having best power levels of 45 dBmW, 24 dBmW, and 34 dBmW, respectively, are all the non-scheduled messages also associated with best cell transmitter 45. The minimum best power level of these messages is 24 dBmW, so the best non-scheduled message is message 84. At step 1840, a message completion time of the last message in the target cell subset is identified. For example, messages 78 and 91 remain in the target cell subset, having transmission times of 23 and 45, respectively, and durations of 4 and 10, respectively. The message completion time of the last message is the transmission time, 45, of the last message, 91, plus the duration of the last message, 10, resulting in a message completion time of the last message of 55. (Times are measured in slot times in this example).

The best non-scheduled message is moved from the non-scheduled subset of messages to the target cell subset, and a new last message is generated in the cell subset by scheduling the transmission time of the best non-scheduled message to be consecutive after the message completion time of the last message in the target cell subset, at step 1850.

A message pair is selected, at step 1910 (FIG. 20), from a plurality of message pairs which consists of all message pairs wherein the first message is the new last message, and wherein a best cell transmitter associated with the first message is adjacent to a best cell transmitter of the second message, and wherein the first message is scheduled for transmission simultaneously with the second message. Outbound path losses $OP(c_s,t_s)$ and $OP(c_f, t_s)$ are determined at step 1915, respectively, for the intended signal which includes the second message and the interfering signal which includes the first message, using the same formulas used at step 1615. The message pair selected at step 1910 is tested at step 1920, using the same determination criteria used at step 1620. When the test result is positive at step 1920, the best non-scheduled message is moved back into the non-scheduled subset at step 1930. When the result is not positive at step 1920 and when all unique message pairs described above which include the best non-scheduled message as the first message have not been selected at step 1925, steps 1910 to 1920 are repeated. When the result is not positive at step 1920 and when all unique message pairs described above which include the best non-scheduled message as the first message have been selected at step 1925, a determination is made at step 1940 as to whether all cell subsets have been selected as target subsets. When a determination is made at step 1940 that all target subsets have not been selected, a new target subset is selected at step 1945 and the method processes the new target subset starting at step 1830. When a determination is made at step 1940 that all target subsets have been selected, a process, which comprises steps 1830, 1840, 1850, 1910, 1915, 1920, 1925, 1930, 1940, and 1945, of adding non-interfering non-scheduled messages at the end of cell subsets is completed, while maintaining non-interference between the messages remaining in the cell subsets, thereby potentially improving the number of non-interfering messages in the cell subsets.

When a determination is made at step 1940 that all target subsets have been selected, a last non-interfering message completion time is determined, at step 1950. The last non-interfering message completion time is the latest message completion time of any message in the cell subsets. It will be appreciated that the last non-interfering message completion time is not necessarily the message completion time of the message having the last transmission time, because a message having an earlier transmission time may have a longer duration. At step 1960, the transmission times of all the remaining non-scheduled messages are scheduled. Each non-scheduled message is scheduled in the cell subset having a best cell transmitter in common with the best cell transmitter associated with the non-scheduled message, and the non-scheduled messages are scheduled for consecutive transmission starting at the last non-interfering message completion time, in order of increasing best power level, without regard to interference testing. When step 1960 is completed, a process of post completion filling is completed, thereby potentially improving the number of messages delivered to the selective call transceivers 106.

It will be appreciated that any one of the processes of advancing messages (steps 1710–1760), adding non-interfering non-scheduled messages (steps 1810–1940), and post completion filling (steps 1950–1960), provides improved scheduling of the set of messages without the use of the others (after interfering messages are initially removed in steps 1610–1680), but that the use of any two will, in general, provide improved scheduling of the set of messages over the use of only one, and that the use of all three generally provides the best improvement of the scheduling of the set of messages.

It will be appreciated that when the method and apparatus described above is used, the message throughput can be further maximized in a radio communication system 100 having sufficient message traffic by increasing the number and geographic density of transmitter/receivers 103, without reducing the maximum power level of each cell transmitter. This will allow, in general, increased numbers of simultaneous outbound signal transmissions to differing selective call transceivers.

By now it should be appreciated that there has been provided a method and apparatus for improving message throughput in a multi-site data radio communication system by improving frequency reuse scheduling of messages queued for transmission to a plurality of selective call transceivers, through the use of a technique for determining a best power level and a best transmitters for each message, and a technique for establishing the transmission times of the messages which uses the best power level and transmitter and which minimizes interferences between the messages.

I claim:

1. A method for scheduling outbound signal transmissions in a radio communication system, wherein the radio communication system comprises a system controller, a plurality of cell transmitters which transmit a plurality of outbound signals, and a plurality of selective call transceivers which transmit inbound signals, and wherein each outbound signal comprises at least one message intended for one of the plurality of selective call transceivers, and wherein the method is used in the system controller and comprises the steps of:

selecting a set of messages from a queue of messages which are queued for delivery to at least one of the plurality of selective call transceivers, wherein each message in the queue of messages is associated with one of the plurality of selective call transceivers and has a duration;

determining a best power level and a best cell transmitter associated with each message in the set of messages, wherein the best power level is determined for use at the best cell transmitter to reliably communicate each message to one of the plurality of selective call transceivers at a minimum required power level;

scheduling transmission times of the set of messages; and controlling transmission of a set of outbound signals comprising the set of messages from the plurality of cell transmitters according to the transmission times scheduled in said step of scheduling transmission times.

2. The method according to claim 1, wherein the radio communication system further comprises a plurality of cell receivers, wherein said step of determining the best power level and the best cell transmitter comprises the steps of:

assembling a set of signal strengths reported in a plurality of inbound signals;

determining a plurality of outbound path losses, each of the plurality of outbound path losses being for a path between one of the plurality of cell transmitters and one of the plurality of selective call transceivers, each of the plurality of outbound path losses being determined from the set of signal strengths; and calculating the best cell transmitter and the best power level for each of the plurality of selective call transceivers based on the plurality of outbound path losses.

3. The method according to claim 2, wherein said step of assembling the set of signal strengths comprises the step of:

recovering information from an inbound signal received at the system controller from one of the plurality of cell receivers, the information including a report of at least one average signal strength of one of the plurality of inbound signals measured at one of the plurality of cell receivers, the report being indicative of a corresponding at least one average signal strength of one of the plurality of outbound signals.

4. The method according to claim 2, wherein said step of assembling the set of signal strengths comprises the step of:

recovering information from an inbound signal received at the system controller from one of the plurality of cell receivers, the information being a report of at least one average signal strength of one of the plurality of outbound signals, wherein the at least one average signal strength of the one of the plurality of outbound signals has been measured by one of the plurality of selective call transceivers.

5. The method according to claim 2, wherein said step of calculating the best cell transmitter and the best power level comprises the steps of:

determining a required power level at a cell transmitter to establish a reliable cell path between the cell transmitter and a selective call transceiver based on one of the plurality of outbound path losses and a predetermined maximum power level associated with the cell transmitter;

generating a transceiver subset which comprises at least one required power level for at least one cell path between the selective call transceiver and at least one of the plurality of cell transmitters; and identifying one of the at least one of the plurality of cell transmitters associated with a minimum of the at least one required power level as the best cell transmitter having the best power level for the selective call transceiver.

6. The method according to claim 5, wherein $OP(c_i, t_j)$ is the one of the plurality of outbound path losses, and wherein $OP(c_i, t_j)$ is for a cell path between the cell transmitter and the selective call transceiver, $(c_i, t_j)$, and wherein $c_i$ is the cell transmitter and $t_j$ is the selective call transceiver, and wherein $P_{max}(c_i)$ is a predetermined maximum transmit power of the cell transmitter, $c_i$, and wherein $C(t_j)$ is a predetermined receiving sensitivity associated with the selective call transceiver, $t_j$, and wherein said step of determining the required power level comprises the steps of:

setting the required power level, $Y(c_i, t_j)$, to the sum of $OP(c_i, t_j)$ and $C(t_j)$ when $OP(c_i, t_j) + C(t_j) <= P_{max}(c_i)$ for the cell path; and setting the required power level, $Y(c_i, t_j)$ to $P_{max}(c_i)$ when $OP(c_i, t_j) + C(t_j) > P_{max}(c_i)$ for the cell path.

7. The method according to claim 6, wherein said step of determining the required power level further includes the step of calculating the one of the plurality of outbound path losses, $OP(c_i, t_j)$, as a difference of a cell transmitter power level and an average minimum received power level.

8. The method according to claim 2, wherein said step of scheduling transmission times comprises the steps of:

generating an initial schedule comprising a plurality of cell subsets of the set of messages, comprising the steps of:

associating with each message in the set of messages the best cell transmitter and the best power level calculated for one of the plurality of selective call transceivers associated with each message;

identifying one or more messages having a best cell transmitter in common as one of the plurality of cell subsets; and scheduling a transmission time of each message in each cell subset to generate sequential, non-overlapping transmissions of the plurality of messages within each cell subset; and improving the initial schedule generated in said step of generating the initial schedule.

9. The method according to claim 8, wherein said step of generating the initial schedule comprises the step of:

scheduling the transmission time of each message in the set of messages consecutively within each of the plurality of cell subsets of the set of messages, firstly in order of increasing value of the best power level, and secondly in order of increasing duration of each message.

10. The method according to claim 8, wherein said step of generating the initial schedule comprises the step of:

scheduling the transmission time of each message in the set of messages consecutively within each of the plurality of cell subsets of the set of messages, in order of increasing value of the best power level.

11. The method according to claim 10, wherein said step of improving the initial schedule further comprises the step of:

testing a message pair for interference, wherein the message pair comprises a first message and a second message, and providing a test result which is positive when the first message is calculated to cause interference with the second message.

12. The method according to claim 11, wherein $S/I(t_s)$ represents a predetermined selective call transceiver signal to interference ratio for a selective call transceiver of the second message, and wherein $Y(c_f, t_f)$ is a best power level associated with the first message, and wherein $Y(c_f, t_f)$ is a best power level associated with the second message, and wherein $OP(c_f, t_s)$ is an outbound path loss from a best cell transmitter associated with the first message to a second selective call transceiver associated with the second message, and wherein $OP(c_s, t_s)$ is an outbound path loss from a best cell transmitter associated with the second message to the second selective call transceiver associated with the second message, and wherein said step of testing the message pair for interference further comprises the step of:

calculating that the first message interferes with the second message when the first message is simultaneous with the second message, and when $Y(c_f, t_f) - OP(c_f, t_s) - (Y(c_s, t_s) - OP(c_s, t_s)) > S/I(t_s)$.

13. The method according to claim 12, wherein said step of determining that the first message interferes with the second message further comprises the steps of:

determining a path loss of the first message, $OP(c_f, t_s)$, as a difference between a cell transmitter power and an average maximum signal strength; and determining a path loss of the second message, $OP(c_s, t_s)$, as a difference between a cell transmitter power and an average minimum signal strength.

14. The method according to claim 11, wherein said step of improving the initial schedule further comprises the steps of:

incrementing one of a plurality of interference counts when the test result is positive;

repeating, for a first plurality of message pairs, in alternating sequence, said step of testing the message pair and said step of incrementing one of the plurality of interference counts;

identifying a message associated with a maximum of the plurality of interference counts as a maximally interfering message when said step of repeating is completed, and identifying a cell subset associated with the maximally interfering message as a maximally interfering subset; and moving the maximally interfering message from the maximally interfering cell subset in the set of messages to a non-scheduled subset of messages.

15. The method according to claim 14, wherein said step of repeating comprises the step of:

selecting the first plurality of message pairs to consist of all permutations of message pairs wherein a best cell transmitter associated with the first message is adjacent to a best cell transmitter associated with the second message, and wherein the first message is scheduled for transmission simultaneously with the second message.

16. The method according to claim 11, wherein said step of improving the initial schedule further comprises the steps of:

advancing a transmission time of a later message having a first transmission time, wherein the later message is in a first cell subset, to a second transmission time which is an earlier time, wherein no portion of the later message is simultaneous with other messages in the first cell subset after the transmission time of the later message is advanced;

identifying a message pair which includes the later message as the first message for said step of testing the message pair; and retarding the transmission time of the later message to the first transmission time when said step of testing the message pair has a test result which is positive.

17. The method according to claim 16, wherein said step of identifying the message pair which includes the later message further comprises the step of:

selecting a second plurality of message pairs, from which the message pair is identified in said step of identifying the message pair which includes the later message, the second plurality of message pairs consisting of all message pairs wherein the first message is the later message, and wherein a best cell transmitter associated with the first message is adjacent to a best cell transmitter associated with the second message, and wherein the first message is scheduled for transmission simultaneously with the second message.

18. The method according to claim 11, wherein said step of improving the initial schedule further comprises the steps of:

selecting a target cell subset;

identifying a message completion time of a last message in the target cell subset;

moving a best non-scheduled message from a non-scheduled subset of messages to the target cell subset, wherein the best non-scheduled message and the target cell subset are associated with a common best cell transmitter; and generating a new last message by scheduling a transmission time of the best non-scheduled message to be consecutive after the message completion time of the last message in the target cell subset.

19. The method according to claim 18, wherein said step of selecting the target cell subset comprises the steps of:

calculating a set of total durations, wherein each total duration in the set of total durations is a sum of the duration of each message in a cell subset which has a best cell transmitter in common with a best cell transmitter of any non-scheduled message;

identifying a cell subset which has a minimum total duration of the set of total durations, as the target cell subset; and selecting a non-scheduled message which has a best cell transmitter which is common with the best cell transmitter of the target cell subset as the best non-scheduled message.

20. The method according to claim 18, wherein said step of moving the best non-scheduled message further comprises the step of:

selecting, as the best non-scheduled message, a non-scheduled message having a best power level which is a minimum power level associated with non-scheduled messages which are associated with the target cell subset.

21. The method according to claim 18, wherein said step of improving the initial schedule further comprises the steps of:

identifying a message pair which includes the new last message as the first message for said step of testing the message pair; and moving the new last message from the target cell subset to the non-scheduled subset of messages when a result of said step of testing the message pair is positive.

22. The method according to claim 21, wherein said step of identifying the message pair which includes the new last message further comprises the step of:

selecting a third plurality of message pairs, from which the message pair is identified in said step of identifying the message pair which includes the new last message, the third plurality of message pairs consisting of all message pairs wherein the first message is the new last message, and wherein a best cell transmitter associated with the first message is adjacent to a best cell transmitter of the second message, and wherein the first message is scheduled for transmission simultaneously with the second message.

23. The method according to claim 11, wherein said step of improving the initial schedule further comprises the steps of:

determining a last non-interfering message completion time; and scheduling the transmission time of a non-scheduled message after the last non-interfering message completion time.

24. The method according to claim 11, wherein said step of improving the initial schedule further comprises the steps of:

incrementing one of a plurality of interference counts when the test result is positive;

repeating, for a plurality of message pairs, in an alternating sequence, said step of testing a message pair and said step of incrementing one of a plurality of interference counts;

identifying a cell subset having a maximum sum of interference counts associated with the messages in the cell subset as a maximally interfering cell subset, when said step of repeating is completed;

identifying a message associated with a maximum interference count in the maximally interfering cell subset as a maximally interfering message; and moving the maximally interfering message from the maximally interfering cell subset in the set of messages to a non-scheduled subset of messages.

25. A system controller for scheduling outbound signal transmissions in a radio communication system, wherein the radio communication system comprises a system controller, a plurality of cell transmitters which transmit a plurality of outbound signals, and a plurality of selective call transceivers which transmit inbound signals, and wherein each outbound signal comprises at least one message intended for one of the plurality of selective call transceivers, and wherein the system controller comprises:

a queue memory for storing a queue of messages which are queued for delivery to at least one of the plurality of selective call transceivers, wherein each message in the queue memory is associated with one of the plurality of selective call transceivers and has a duration;

message selection means, coupled to said queue memory, for selecting a set of messages from the queue memory;

a scheduled memory, coupled to said message selection means for storing the set of messages;

best cell means for determining a best power level and a best cell transmitter associated with each message in the set of messages, wherein the best power level is determined for use at the best cell transmitter to reliably communicate each message to one of the plurality of selective call transceivers at a minimum required power level;

scheduling means, coupled to said best cell means and said scheduled memory, for scheduling transmission times of the set of messages; and a cell site controller, coupled to said queue memory, said scheduled memory, and said plurality of cell transmitters, for controlling transmissions of a set of outbound signals from the plurality of cell transmitters according to the transmission times stored in said scheduled memory, wherein the set of outbound signals comprise the set of messages stored in said scheduled memory.

26. The system controller according to claim 25, wherein the radio communication system further comprises a plurality of cell receivers coupled to said cell site controller, and wherein said best cell means comprises:

signal strength collection means, coupled to said cell site controller, for assembling a set of signal strengths reported in a plurality of inbound signals;

path loss means, coupled to said signal strength collection means, for determining a plurality of outbound path losses, each of the plurality of outbound path losses being for a path from one of the plurality of cell transmitters to a selective call transceiver, each of the plurality of outbound path losses being determined from the set of signal strengths; and best cell analysis means, coupled to said path loss means and said scheduled memory, for calculating the best cell transmitter and the best power level for each of the plurality of selective call transceivers based on the plurality of outbound path losses.

27. The system controller according to claim 26, wherein $OP(c_i,t_j)$ is one of the plurality of outbound path losses, and wherein $OP(c_i,t_j)$ is for a cell path from a cell transmitter to selective call transceiver, $(c_i,t_j)$, and wherein $c_i$ is one of the plurality of cell transmitters and $t_j$ is one of the plurality of selective call transceivers, and wherein $P_{max}(c_i)$ is a predetermined maximum transmit power of a cell transmitter, $c_i$, and wherein $C(t_j)$ is a predetermined receiving sensitivity associated with the selective call transceiver, $t_j$, and wherein the best cell analysis means comprises:

required power means, coupled to said path loss means, for setting a required power level, $Y(c_i,t_j)$, to $OP(c_i,t_j)+C(t_j)$ when $OP(c_i,t_j)+C(t_j)<=P_{max}(c_i)$ for the cell path, and for setting the required power level, $Y(c_i,t_j)$, to $P_{max}(c_i)$ when $OP(c_i,t_j)+C(t_j)>P_{max}(c_i)$ for the cell path; and best cell selection means, coupled to said required power means, for selecting the best cell transmitter and the best power level for one of the plurality of selective call transceivers, $t_j$, said best cell selection means comprising:

transceiver subset means for generating a transceiver subset, the transceiver subset comprising at least one required power level, $Y(c,t_j)$, for at least one cell path between the selective call transceiver, $t_j$, and at least one of the plurality of cell transmitters; and best cell identification means, coupled to said transceiver subset means and said scheduled memory, for identifying one of the at least one of the plurality of cell transmitters associated with a minimum of the at least one required power level as being the best cell transmitter having the best power level for the selective call transceiver, $t_j$.

28. The system controller according to claim 27, wherein the path loss means calculates the one of the plurality of outbound path losses, $OP(c_i,t_j)$, as a difference of a cell transmitter power level and an average minimum received power level.

29. The system controller according to claim 26, wherein the scheduling means comprises:

a cell subset generator, coupled to said best cell means, said message selection means, and said scheduled memory, for generating a plurality of cell subsets of the set of messages, by associating with each message in the set of messages the best cell transmitter and the best power level calculated for one of the plurality of selective call transceivers associated with each message, and by identifying one or more messages having a best cell transmitter in common as one of the plurality of cell subsets; and a scheduler, coupled to said scheduled memory and said path loss means, for scheduling a transmission time of each message in each cell subset to generate sequential, non-overlapping messages within each cell subset.

30. The system controller according to claim 29, wherein said cell subset generator comprises an ordering means, coupled to said scheduled memory, for initially scheduling the transmission time of each of the one or more messages in the set of messages consecutively within each of the plurality of cell subsets of the set of messages, firstly in order of increasing value of the best power level, and secondly in order of increasing duration of each message.

31. The system controller according to claim 29, wherein said cell subset generator comprises an ordering means, coupled to said scheduled memory, for initially scheduling the transmission time of each message in the set of messages consecutively within each of the plurality of cell subsets of the set of messages, in order of increasing value of the best power level.

32. The system controller according to claim 29, wherein said scheduler further comprises an interference tester, coupled to said scheduled memory and said path loss means, for testing message pairs for interference, wherein a message pair comprises a first message and a second message, and wherein said interference tester comprises a test output which is positive when the first message is calculated to cause interference with the second message.

33. The system controller according to claim 32, wherein $S/I(t_s)$ represents a predetermined selective call transceiver signal to interference ratio for a selective call transceiver of the second message, and wherein $Y(c_f,t_f)$ is a best power level associated with the first message, and wherein $Y(c_s,t_s)$ is a best power level associated with the second message, and wherein $OP(c_f,t_s)$ is an outbound path loss from a best cell transmitter associated with the first message to a second selective call transceiver associated with the second message, and wherein $OP(c_s,t_s)$ is an outbound path loss from a best cell transmitter associated with the second message to the second selective call transceiver associated with the second message, and wherein said interference tester further comprises:
 a calculator coupled to said path loss means for determining that the first message interferes with the second message when the first message is simultaneous with the second message and when $Y(c_f,t_f)-OP(c_f,t_s)-(Y(c_s,t_s)-OP(c_s,t_s))>S/I(t_s)$.

34. The system controller according to claim 33, wherein said path loss means determines a path loss, $OP(c_f,t_s)$, of the first message as a difference between a cell transmitter power and an average maximum signal strength; and wherein said path loss means determines a path loss, $OP(c_s,t_s)$, of the second message as a difference between a cell transmitter power and an average minimum signal strength.

35. The system controller according to claim 32, wherein said scheduler further comprises a maximal interfering message remover, coupled to a non-scheduled memory and said interference tester, and wherein the maximal interfering message remover is for identifying a plurality of message pairs for testing by said interference tester, and wherein the maximal interfering message remover is for incrementing one of a plurality of interference counts when the test output is positive, and wherein the maximal interfering message remover is for identifying a maximum of the plurality of interference counts, and for identifying a message associated therewith as a maximally interfering message, and wherein the maximal interfering message remover is for removing the maximally interfering message from the scheduled memory to the non-scheduled memory.

36. The system controller according to claim 35, wherein said maximal interfering message remover comprises a message pair selector, coupled to said scheduled memory and said interference tester, for selecting the plurality of message pairs to consist of all permutations of message pairs wherein a best cell transmitter associated with the first message is adjacent to a best cell transmitter associated with the second message, and wherein the first message is scheduled for transmission simultaneously with the second message.

37. The system controller according to claim 32, wherein said scheduler further comprises a message advancer, coupled to said interference tester and said scheduled memory, and wherein the message advancer is for advancing a transmission time of a later message having a first transmission time, wherein the later message is in a first cell subset, to a second time which is an earlier time, wherein no portion of the later message is simultaneous with other messages in the first cell subset after the transmission time of the later message is advanced, and wherein the message advancer is for selecting a set of message pairs, each of which is tested by said interference tester, and wherein each of the set of message pairs includes the later message as the first message, and wherein the message advancer is for retarding the transmission time of the later message to the first transmission time when said interference tester has a positive output.

38. The system controller according to claim 32, wherein said scheduler further comprises a non-scheduled message optimizer, coupled to a non-scheduled memory and said scheduled memory, and wherein the non-scheduled message optimizer is for selecting a target cell subset, and wherein the non-scheduled message optimizer is for identifying a message completion time of a last message in the target cell subset, and wherein the non-scheduled message optimizer is for moving a best non-scheduled message from the non-scheduled memory to the target cell subset, and wherein the best non-scheduled message and the target cell subset are associated with a common best cell transmitter, and wherein the non-scheduled message optimizer is for generating a new last message by scheduling a transmission time of the best non-scheduled message to be consecutive to the message completion time of the last message in the target cell subset.

39. The system controller according to claim 38, wherein said non-scheduled message optimizer comprises:
 a non-scheduled message selector for calculating a set of total durations, wherein each total duration in the set of total durations is a sum of the duration of each message in a cell subset which has a best cell transmitter in common with a best cell transmitter of any non-scheduled message, and wherein said non-scheduled message selector is for identifying a cell subset which has a minimum total duration of the set of total durations, as the target cell subset, and wherein said non-scheduled message selector is for selecting a non-scheduled message which has an associated best cell transmitter which is common with the best cell transmitter of the target cell subset as the best non-scheduled message.

40. The system controller according to claim 38, wherein said non-scheduled message optimizer comprises a power selector which is for selecting, as the best non-scheduled message, a non-scheduled message having a best power level which is a minimum power level associated with non-scheduled messages which are associated with the target cell subset.

41. The system controller according to claim 38, wherein said non-scheduled message optimizer further comprises an optimizer tester for testing an optimized set of message pairs, each of which is tested by said interference tester, wherein each of the optimized set of message pairs includes the new last message as the first message, and wherein said optimizer tester is for moving the new last message from the target cell subset to the non-scheduled memory when the test output is positive.

42. The system controller according to claim 32, wherein said scheduler further comprises a post completion scheduler, coupled to said scheduled memory and a non-scheduled memory, wherein said post completion scheduler is for determining a last non-interfering message completion time, and wherein said post completion scheduler is for moving a non-scheduled message from the non-scheduled memory to a cell subset which has a cell transmitter in common with the non-scheduled message, and wherein said post completion scheduler is for scheduling a transmission time of the non-scheduled message after the last non-interfering message completion time.

* * * * *